United States Patent
Patel et al.

(10) Patent No.: US 6,584,369 B2
(45) Date of Patent: Jun. 24, 2003

(54) METHOD AND SYSTEM FOR DISPATCHING SEMICONDUCTOR LOTS TO MANUFACTURING EQUIPMENT FOR FABRICATION

(75) Inventors: Nital S. Patel, Plano, TX (US); Steven T. Jenkins, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

(21) Appl. No.: 09/769,866

(22) Filed: Jan. 25, 2001

(65) Prior Publication Data

US 2002/0107599 A1 Aug. 8, 2002

Related U.S. Application Data

(60) Provisional application No. 60/179,649, filed on Feb. 2, 2000.

(51) Int. Cl.[7] .............................................. G06F 19/00
(52) U.S. Cl. .................... 700/100; 700/97; 700/104; 700/108; 705/7
(58) Field of Search ........................ 700/97, 99, 100, 700/104, 108

(56) References Cited

U.S. PATENT DOCUMENTS

| | | | | |
|---|---|---|---|---|
| 4,195,041 A | * | 3/1980 | Kawamura et al. | 700/100 |
| 4,866,628 A | | 9/1989 | Natarajan | 364/468 |
| 5,260,868 A | * | 11/1993 | Gupta et al. | 700/100 |
| 5,291,397 A | * | 3/1994 | Powell | 700/97 |
| 5,375,061 A | * | 12/1994 | Hara et al. | 700/101 |
| 5,559,710 A | * | 9/1996 | Shahraray et al. | 700/100 |
| 5,668,733 A | * | 9/1997 | Morimoto et al. | 716/19 |
| 5,706,200 A | * | 1/1998 | Kumar et al. | 700/100 |
| 5,721,686 A | * | 2/1998 | Shahraray et al. | 700/102 |
| 5,737,728 A | | 4/1998 | Sisley et al. | 705/8 |
| 5,818,716 A | | 10/1998 | Chin et al. | 364/468.06 |
| 5,826,238 A | * | 10/1998 | Chen et al. | 705/8 |
| 5,841,677 A | * | 11/1998 | Yang et al. | 702/176 |
| 6,351,686 B1 | * | 2/2002 | Iwasaki et al. | 700/228 |

OTHER PUBLICATIONS

Reduce Complexity Nonlinear H∞ Controllers: Relation to certainty equivalence. In *Proceedings of the 13th IFAC World Congress*, vol. E; pp. 383–387, J.S. Baras and N.S. Patel., 1966.

(List continued on next page.)

*Primary Examiner*—Leo Picard
*Assistant Examiner*—Michael D. Masinick
(74) *Attorney, Agent, or Firm*—Yingshing Tung; Wade James Brady, III; Frederick J. Telecky, Jr.

(57) ABSTRACT

A method for dispatching available lots to unallocated machines is provided that includes receiving metrics data (26) providing performance measurements for a plurality of machines (18). The method next provides for determining a state for each of the machines (18) based on the metrics data (26). The method next provides for receiving one or more lots (22) to be dispatched where each lot (22) has a lot type and each lot type is associated with one of a plurality of models. The method next provides for selecting a preferred lot type (50) for each of the plurality of models associated with each of the machines (18) based on the state of the machine. The method next provides for selecting a preferred model (52) based on a time since a last run of the model, a cost of switching to a new model and lot type, and the state of the machine (18). The method next provides for resolving conflicts between selected preferred lot type/preferred model combinations when insufficient lots (22) are available to fill the selections. The method next provides for assigning each lot (22) to one of the machines (18) according to the preferred model (52) and preferred lot type (46) selections.

8 Claims, 5 Drawing Sheets

OTHER PUBLICATIONS

Robust Control of Set–Valued Discrete Time Dynamical Systems. *IEEE Transactions on Automatic Control*, 43(1):61–75, J.S. Baras and N.S. Patel, 1998.

*Neuro–Dynamic Programming*. Athena Scientific, Belmont, MA, D.P. Bertsekas and J.N. Tsitsiklis, 1996.

Scheduling Semiconductor Lines Using a Fluid Network Model. *IEEE Transactions on Robotics and Automation*, 10(2):88–98, D. Connors, G. Feigin, and D. Yao, 1994.

Multi–armed Bandit Allocation Indices, J. C. Gittins, 1989.

A Dynamic Allocation Index for the Sequential Design of Experiments. In J. Gani, editor, *Progress in Statistics*, pp. 241–266, J. C. Gittins and D.M. Jones, 1974.

On the Certainty Equivalence Principle for Partially Observed Dynamic Games. *IEEE transactions on Automatic Control*, 39(11):2321–2324; M.R. James, 1994.

Recent Developments in Nonlinear H∞ Control. In Preprints of *IFAC Nonlinear Control Design Symposium* (NOLCOS'95), pp 578–589; M.R. James, 1995.

Scheduling Semiconductor Manufacturing Plants. *IEEE Control Systems*, pp 33–40; P.R. Kumar, 1994.

*Stochastic Systems: Estimation, Identification, and Adaptive Control*; by P.R. Kumar and P. Varaiya, 1986.

Efficient Scheduling Policies to Reduce Mean and Variance of Cycle– Time in Semiconductor Manufacturing Plants, IEEE Transactions on Semiconductor Manufacturing, 7(3):374–388; by S.C.H. Lu, D. Ramaswamy, and P.R. Kumar, 1994.

Impact of Multi–Product and –Process Manufacturing on Run–to–Run Control, *Process, Equipment and Materials Control in Integrated Circuit Manufacturing III*, pp 138–146 by M.L. Miller, 1997.

Scheduling: Theory, Algorithms, and Systems, by M. Pinedo, 1995.

Feature–Based Methods for Large–Scale Dynamic Programming. Master's Theses, Massachusetts Institute of Technology by B.V. Roy, 1994.

Run by Run Control: Combining SPC and Feedback Control. IEEE Transactions on Semiconductor Manufacturing, 8(1):26–43, 1995.

\* cited by examiner

METHOD AND SYSTEM FOR DISPATCHING SEMICONDUCTOR LOTS TO MANUFACTURING EQUIPMENT FOR FABRICATION

This application claims priority under 35 USC §119(e)(1) of provisional application No. 60/179,649 filed Feb. 2, 2000.

TECHNICAL FIELD OF THE INVENTION

This invention relates generally to the field of process control, and more particularly to a method and system for dispatching semiconductor lots to manufacturing equipment for fabrication.

BACKGROUND OF THE INVENTION

In a semiconductor manufacturing fabrication facility with a production-to-order type operation, control of many machines and various processes must be managed. There are always the major goals and tasks of providing short cycle times and precise delivery schedules for the purpose of satisfying expectations of customers. Difficulties encountered are a complex set of choices of process mix and of product mix, unscheduled machine down times and equipment arrangements. How to effectively schedule and dispatch lots has become a very important topic in handling manufacturing. Within each such fabrication facility, a scheduler typically drives a buffer of available lots to be processed. The buffer of available lots is typically fed to a dispatcher that allocates available lots to specific machines or processes.

In general, dispatch systems can be open loop or closed loop. Open loop dispatch systems make dispatch decisions without regard to the actual performance of the system and without regard to the dispatch decisions. Open loop dispatch systems rely solely on the open loop model of the process and assume that the process does what is expected of it. Closed loop dispatch systems make dispatch decisions and then feed back appropriate information to help improve future dispatch decisions. The closed loop dispatch systems learn, with feedback, what is occurring in the system and then changes the dispatch behavior based upon that information.

SUMMARY OF THE INVENTION

In accordance with the present invention, a method and system for dispatching semiconductor lots to manufacturing equipment for fabrication are provided that substantially reduce or eliminate disadvantages and problems associated with conventional lot dispatchers. More particularly, the dispatch system and method implements a closed-loop system that minimizes the influence of process and inventory disturbances and optimizes process performance.

According to an embodiment of the present invention, there is provided a method for dispatching available lots to unallocated machines that includes receiving metrics data providing performance measurements for a plurality of machines. The method next provides for determining a state for each of the machines based on the metrics data. The method next provides for receiving one or more lots to be dispatched where each lot has a lot type and each lot type is associated with one of a plurality of models. The method next provides for selecting a preferred lot type for each of the plurality of models associated with each of the machines based on the state of the machine. The method next provides for selecting a preferred model based on a time since a last run of the model, a cost of switching to a new model and lot type, and the state of the machine. The method next provides for resolving conflicts between selected preferred lot types/preferred model combinations when insufficient lots are available to fill the selections. The method next provides for assigning each lot to one of the machines according to the preferred model and preferred lot type selections.

Technical advantages include providing an improved dispatch system for semiconductor manufacturing facilities. In particular, the dispatch system uses process performance information to dispatch available lots to available machines. As a result, process performance is optimized.

In addition, the dispatcher takes the cost of switching between processes into account in making dispatch decisions. The dispatch system assures adequate sampling of machines in the semiconductor fabrication facility that in turn provides for optimal machine, or process, performance.

Other technical advantages may be readily apparent to one skilled in the art in the following figures, description and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which.

DETAILED DESCRIPTION OF THE INVENTION

Figure 1:
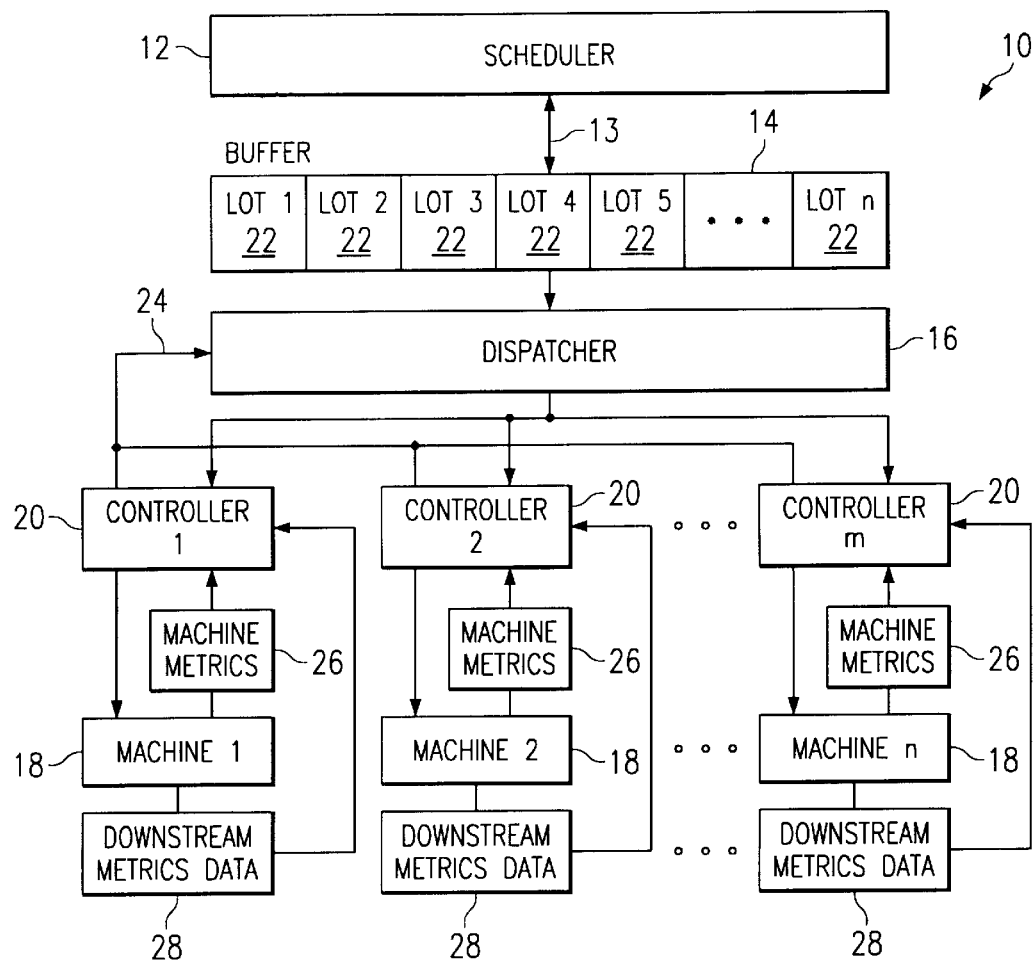
FIG. 1 is a block diagram illustrating a processing system including a scheduler and a dispatcher in accordance with one embodiment of the present invention.

Referring to FIG. 1, a work cell is generally indicated at 10. Work cell 10 is a system designed to perform a work function using various machines, or processes, assigned to work cell 10. In an exemplary embodiment, work cell 10 is a group of machines in a semiconductor fabrication facility organized such that a series of fabrication processes may be performed on semiconductor wafers using the various machines. However, any suitable work cell may be used such as a work cell to select a telecommunications channel. The present invention may be used with any process that may be sampled.

Work cell 10 includes a scheduler 12, a buffer 14, a dispatcher 16, and a plurality of machines 18. Each machine 18 may have an associated controller 20. However, the controller 20 functions may be performed by the dispatcher 16. By using a controller 20 for each machine 18, the processes of the present invention may be distributed between controller 20 and dispatcher 16.

Scheduler 12 develops a list of lots 13 to be processed by work cell 10 and places the list of lots 13 in buffer 14. The list of lots 13 includes one or more lots 22. Dispatcher 16 takes the available lots 22 in buffer 14 and dispatches each lot 22 to optimize operation of the work cell 10. Dispatcher 16 bases its dispatch decisions in part on feedback data 24 from each machine 18. Feedback data 24 includes machine metrics 26 from each machine 18 and downstream metric data 28. In the exemplary embodiment, machine metrics 26 and downstream metric data 28 are forwarded to an associated controller 20 that then forwards the feedback data 24 to dispatcher 16. Controller 20 may use the metric information for process control purposes such as controlling the associated machine 18.

Machine metrics 26 includes measurements on a particular machine 18 such as temperature, vacuum pressure, electrical current flow, and any other suitable machine measurements. Downstream metric data 28 may be gathered from testing devices designed to measure critical dimensions, product functionality, device errors, or any other suitable metric data.

The work cell 10 implements a closed-loop dispatch system to make dispatch decisions and then to feedback appropriate information to help improve future dispatch (allocation) decisions in work cell 10. The closed-loop dispatch system learns, with feedback, what is occurring in work cell 10 and then changes the dispatcher 16 behavior based on that information. This allows the work cell 10 to account for various disturbances that affect operations. Cell disturbances include buffer disturbances. For example, work cell 10 performance may be affected by changes in the product, or lot, mix appearing in buffer 14. The proportion of different types of lots in buffer 14 may change on a daily basis. Another type of disturbance affecting work cell 10 performance includes equipment drift. Equipment drift may be caused by equipment going out of alignment, having temperature sensors fail, or other equipment disturbances. These equipment disturbances cause changes in product fabrication that may not affect the current lot 22 being processed by a particular machine 18, but that may significantly affect a later lot 22 dispatched to the particular machine 18.

In an embodiment, the closed-loop dispatch system is non-idling meaning that if sufficient lots 22 are available, none of the available machines 18 will be idle. This results in maximizing throughput through work cell 10. The closed-loop dispatch system also allocates low running lots 22 first so that adequate sampling is obtained on which to make future dispatch decisions. The closed-loop dispatch system soft dedicates machines 18, preferring to run a given type of low running lot 22 on a limited set of machines 18. This results in better control due to higher sampling rates on a limited set of machines 18. Thus, for low volume lots, the dispatcher 16 tries to allocate lots 22 to machines 18 best suited (in a performance sense) to run the lots 22. High volume lots 22 are run on many machines 18 thereby providing sampling data on all available machines 18. If a specific lot 22 (process) is run on multiple machines 18, and if one of those machines 18 has a process shift that significantly degrades its performance, the dispatcher 16 will try to limit lots 22 run on that machine 18. Once appropriate corrective action is taken for the machine 18, the dispatcher 16 will again start loading that machine 18.

The cost for a particular machine 18 to switch to a new process for new lot 22 includes the cost involved in switching product mixes, machine settings, reticle mixtures, and any other suitable variables. The cost for a particular machine 18 to not switch to a new process includes having insufficient sampling data for running a type of lot 22 on that particular machine 18. Future dispatch decisions rely on sufficient feedback data 24 in the form of process sampling to make future dispatch decisions.

In operation, scheduler 12 determines lots 22 that need to be processed within the next period of time where the period of time may be any suitable period including hours or days. Upon receiving a dispatch event such as one of the machines 18 becoming available to accept a new lot 22, dispatcher 16 then assigns a lot 22 from buffer 14 to a particular machine 18 for processing. The dispatcher 16 bases its dispatch decisions on feedback data 24 and on the cost for a particular machine 18 to switch to a new process as compared to that machine 18 not switching to the new process.

After a machine 18 completes an assigned lot 22 or process, machine 18, through feedback data 24, informs dispatcher 16 that it requires a lot 22 for processing. Dispatcher 16 then allocates available lots 22 in buffer 14 to idle, or available, machines 18. Reallocating lots 22 to machines 18 with each request for a lot 22 by a machine 18 allows dispatcher 16 to make sure that changes in buffer 14 are taken into account prior to allocating a lot 22 to a machine 18. Scheduler 12 can change lots 22 in buffer 14 at any time. By doing this, scheduler 12 handles priority lots 22 by removing non-priority lots 22 from buffer 14 to ensure that priority lots 22 are dispatched next.

Figure 2:
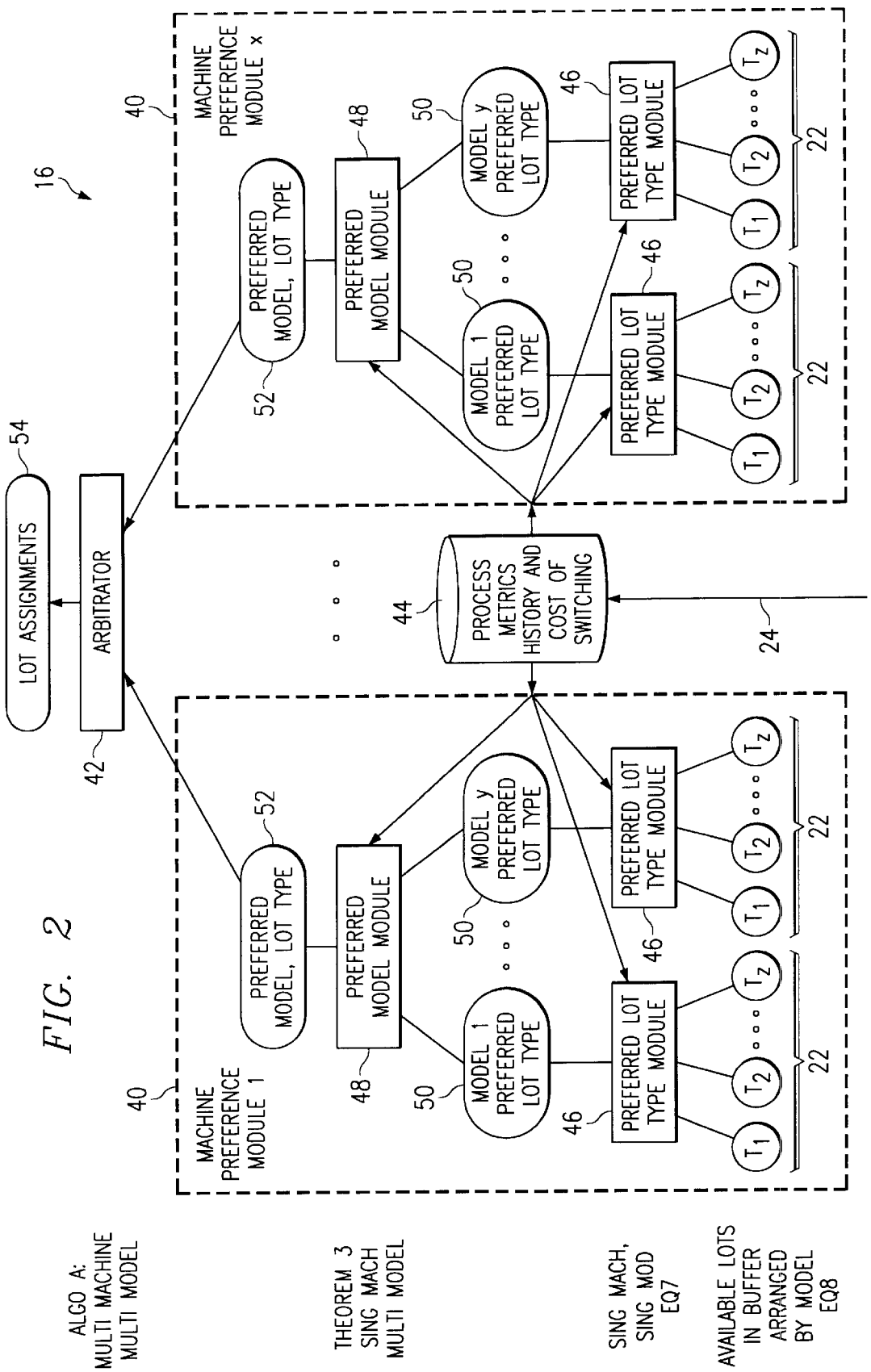
FIG. 2 is a block diagram illustrating the dispatcher of FIG. 1 including a preferred lot type module, a preferred model module and an arbitrator in accordance with one embodiment of the present invention.

Referring to FIG. 2, details of dispatcher 16 are illustrated. Dispatcher 16 includes a machine preference module 40 for each machine 18 in work cell 10, an arbitrator 42, and a metrics history and switching cost data 44. Each machine preference model 40 retrieves data from metric history and switching cost data 44 and determines a preferred lot type from available lot types represented in buffer 14. The preferred lot types are submitted to arbitrator 42 where any conflicts between determined preferred lot types are resolved. Each machine preference module 40 includes a preferred lot type module 46 for each model that may be processed by a particular machine 18 and a preferred model module 48. As described in more detail below, each preferred lot type module 46 generates a preferred lot type 50 from the available lots 22 associated with a particular model. The preferred model module 46 generates a preferred model 52 from the plurality of preferred lot types 50 where each preferred lot type 50 is associated with a particular model. In one embodiment, dispatcher 16, machine preference module 40, arbitrator 42, preferred lot type module 46, and preferred model module 48 are implemented in one or more software modules stored in a computer readable medium.

Each lot 22 in buffer 14 is a member of a particular lot type. A lot 22 is a specific instance of a lot type. A lot type represents any classification that is used to identify differences between lots within a given model. In the exemplary embodiment, a lot type may represent the time period and target thicknesses for an oxidation layer grown in a furnace. Other examples of lot types may include lots with different device pattern densities that have the same targets but need different exposures to achieve a particular target line width.

Each lot type is a member of a model. Thus, the lot types are grouped into lot types associated with a particular model. The model identifies a common characteristic of the group of lot types associated with the model. In an exemplary embodiment, a model represents the expected output from a machine 18 running a recipe on a lot 22 of wafers. In that embodiment, the model may represent a specific temperature, pressure and deposition time combination for a furnace and the associated deposition thicknesses resulting from that model. Other examples of models may include the over-etch time necessary to hit a target polysilicon line width in an etch machine 18 where the incoming material comes from the same photo-stepper. Any other suitable model may be used.

A machine 18 may process one or more models. Each model may include one or more lot types. Each lot type may be represented by one or more lots 22 in buffer 14. Although the present invention is discussed with reference to lots, lots types, models, and machines as used in a semiconductor fabrication facility, the present invention is applicable to a variety of processes including other types of manufacturing or allocation of channels in a telecommunications system.

In the exemplary embodiment, the inventory of lots 22 in buffer 14 are divided according to the model associated with specific lots 22. Each model is further divided by lot types. For example, in the case of oxidation furnaces, different ambients would imply different models. Each model in turn could account for different target thicknesses by using different lot types. In certain cases, for example overlay situations, different models could correspond to different pattern levels with each model having a single lot type.

In operation, each machine preference module 40, associated with a particular machine 18, selects and requests a particular lot 22 from buffer 14. Each machine preference module 40 first groups the lots 22 in buffer 14 by a model associated with lots 22 that may be processed by machine 18. Preferred lot type module 46 then selects a preferred lot type 50 for a particular model from the lot types of the available lots 22 for that model. Preferred lot type module 46 uses information from metrics history and switching cost data 44 to assist in the decision.

After each preferred lot type module 46 has selected a preferred lot type 50 for its associated model, preferred model module 48 selects one of the models associated with the preferred lot types 50 as a preferred model 52. Preferred model 52 includes the preferred lot type 50 for the selected model. Preferred model module 48 uses metrics history and switching cost data 44 to assist in selecting and requesting the preferred model 52.

After each machine preference module 40 has selected and requested a preferred model 52, arbitrator 42 resolves conflicts between machine preference modules 40 that request the same preferred model 52 and preferred lot type 50 when insufficient lots 22 exist in buffer 14 to fill the requests. Arbitrator 42 produces an optimal list of lot assignments 54. Lot assignments 54 allocate, or assign, a particular lot 22 in buffer 14 to a particular machine 18.

Figure 3:
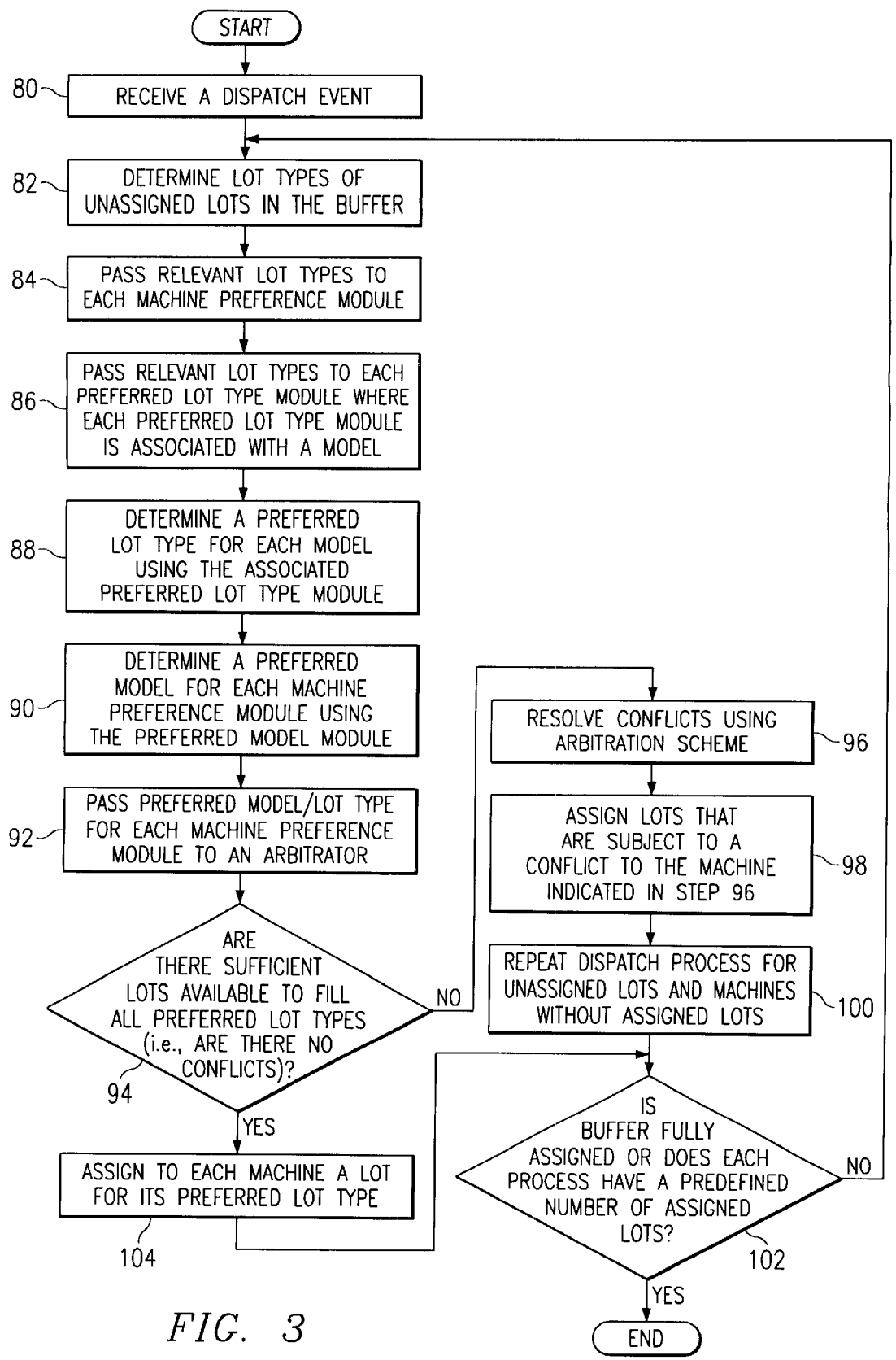
FIG. 3 is a flow diagram illustrating operation of the dispatcher of FIG. 2 in accordance with one embodiment of the present invention.

Referring to FIG. 3, the general processing flow of dispatcher 16 is illustrated. The process commences at step 80 where dispatcher 16 receives a dispatch event. A dispatch event occurs when a machine 18 completes its assigned process (lot) and is available to accept a new lot 22 from buffer 14.

The process proceeds to step 82 where dispatcher 16 determines the lot types of unassigned lots 22 in buffer 14. Each lot 22 is associated with a lot type, and each lot type is associated with a model. Unassigned lots 22 are those lots that are not committed to a particular machine 18. In one embodiment, lots 22 are committed once they are assigned to a particular machine 18. However, in another embodiment, lots 22 are not committed until they are in process on the assigned machine 18.

The process proceeds to step 84 where the lots 22 associated with relevant lot types are passed to each machine preference module 40. The relevant lot types are lot types belonging to models that may be processed by the particular machine 18 associated with the machine preference module 40.

The process proceeds to step 86 where the lot types associated with a common model are passed to the preferred lot type module 46 for that particular model. Each lot type is associated with a particular model and is therefore forwarded to the preferred lot type module 46 for that particular model.

The process proceeds to step 88 where each preferred lot type module 46 determines a preferred lot type 50 from the available lot types of the relevant lots 22. The preferred lot type is the lot type that will assist in assuring that the associated machine 18 continues to perform at an optimal level. The process of determining a preferred lot type 50 will be discussed in more detail with reference to FIG. 5.

The process proceeds to step 90 where preferred model module 48 selects a preferred model 52 from the preferred lot types 50 generated in step 88. Each machine preference module 40 selects one preferred model 52. The preferred model 50 has a preferred lot type 52 associated with it. Multiple lots 22 in buffer 14 may satisfy the requested preferred model 52 and preferred lot type 50. In the exemplary embodiment, multiple lots of the same wafer may be scheduled by scheduler 12 and placed in buffer 14. Identical lots will have the same lot type and model. A method for selecting a preferred model 52 will be discussed in more detail with reference to FIG. 6.

The process proceeds to step 92 where the preferred model 52 from each machine preference module 40 is passed to arbitrator 42. Preferred model 52 also includes an associated preferred lot type 50.

The process proceeds to decisional step 94 where a decision is made regarding whether there are sufficient lots 22 available in buffer 14 to fill all preferred model 52 requests. If there are insufficient lots available to fill all preferred model 52 requests, the NO branch of decisional step 94 proceeds to step 96 where arbitrator 42 resolves conflicts between machine preference modules 40 requesting the same preferred model 52 and preferred lot type 50.

The process proceeds to step 98 where lots 22 that are subject to a conflict are assigned to the machine 18 indicated in step 96. The lot assignments are stored in lot assignments 54.

The process proceeds to step 100 where the dispatch process is repeated for unassigned lots 22 and machines 18 without assigned lots. Machines 18 that did not receive an assigned lot 22 select another lot choice from buffer 14. Arbitrator 42 then resolves any conflicts between the new selections received from machines 18 that did not receive an assigned lot 22 in the previous pass through the dispatch process. The method of resolving conflicts between selected preferred model 52 and preferred lot type 50 will be described in more detail with reference to FIG. 4 regarding arbitrator 42.

The process proceeds to decisional step 102 where a decision is made regarding whether all lots 22 in buffer 14 are fully assigned or whether each machine 18 has a predefined number of assigned lots. This decisional step allows each machine preference module 40 to make a number of ordered selections from buffer 14. Thus, each machine 18 may select a first choice, a second choice, and so on until a predefined number of choices is made. This allows a certain number of predefined lots to be frozen and statically assigned to a particular machine 18. If the buffer is not fully assigned or each machine 18 does not have a predefined number of assigned lots, the NO branch of decisional step 102 proceeds to step 82 where the dispatch process is repeated. If the buffer is fully assigned or each machine 18 has a predefined number of assigned lots, the YES branch of decisional step 102 terminates the process.

Referring again to decisional step 94, if there are sufficient lots 22 available in buffer 14 to fill all preferred model 52 and preferred lot type 50 requests from machine preference modules 40, the YES branch of decisional step 94 proceeds to step 104 where lots 22 in buffer 14 are assigned to machines 18 and placed in lot assignments 54 according to the preferred model 52 and preferred lot type 50. After step 104, the process proceeds to decisional step 102.

Figure 4:
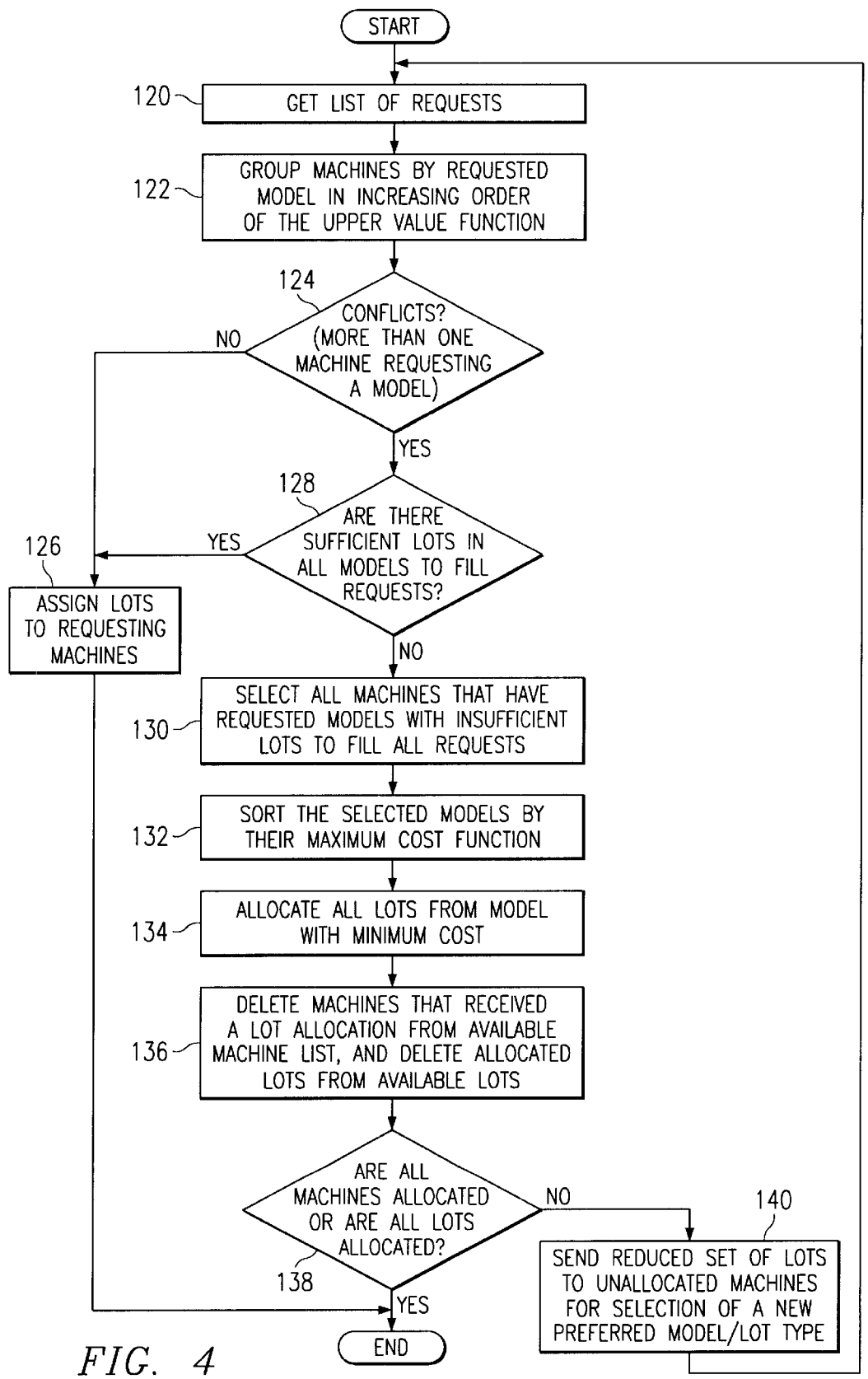
FIG. 4 is a flow diagram illustrating the process of the arbitrator of FIG. 2 in accordance with one embodiment of the present invention.

Referring to FIG. 4, the method of arbitrator 42 in dispatcher 16 is illustrated. The method commences at step 120 where the list of requests in the form of preferred models 52 and associated preferred lot types 50 is received from the machine preference modules 40. Each machine preference module 40 is associated with a particular machine 18 and selects a preferred model and lot type associated with one of the lots 22 in buffer 14 for processing.

The method proceeds to step 122 where the machines 18 are grouped by the requested preferred model 52 and associated preferred lot type 50 in increasing order of an upper value function.

The method proceeds to decisional step 124 where arbitrator 42 determines whether any conflicts exist. A conflict is defined as more than one machine 18 requesting a particular model and lot type. If there are no conflicts, the NO branch of decisional step 124 proceeds to step 126 where lots 22 in buffer 14 are assigned to the requesting machines 18. After step 126 the method terminates.

Returning to decisional step 124, if there are conflicts, the YES branch of decisional step 124 proceeds to decisional step 128 where a decision is made regarding whether there are sufficient lots 22 to fill all requested preferred models 52 and associated preferred lot types 50. If there are sufficient lots, the YES branch of decisional step 128 proceeds to step 126. If there are insufficient lots, the NO branch of decisional step 128 proceeds to step 130 where all machines 18 that have requested preferred models 52 with insufficient lots 22 to fill those requests are selected as a group of machines 18 with conflicts.

The method proceeds to step 132 where the requested models 52 associated with the group of machines 18 with conflicts selected in step 130 are sorted by their maximum cost (upper value) function. The maximum cost function is described in further detail below.

The method proceeds to step 134 where lots 22 in buffer 14 are allocated from the model with the minimum maximum cost function as determined in step 132.

The method proceeds to step 136 where the machines 18 that received a lot 22 allocation are removed from the group of machines 18 with conflicts. In addition, all lots 22 that are allocated are removed from the lots 22 that are available for allocation.

The method proceeds to decisional step 138 where a decision is made regarding whether all machines 18 have an allocated lot 22 or whether all lots 22 are allocated. If all machines 18 have an allocated lot 22 or all lots 22 are allocated, the YES branch of decisional step 138 terminates the method. If all machines 18 do not have an allocated lot or all lots 22 are not allocated, the NO branch of decisional step 138 proceeds to step 140 where the reduced set of available lots 22 are forwarded to the unallocated machines 18 for selection of a new preferred model 52 and associated preferred lot type 50. After step 140, the method proceeds to step 120 where the arbitration process is repeated for machines 18 without allocated lots 22. An exemplary embodiment of arbitrator 42 will be described in more detail below.

Figure 5:
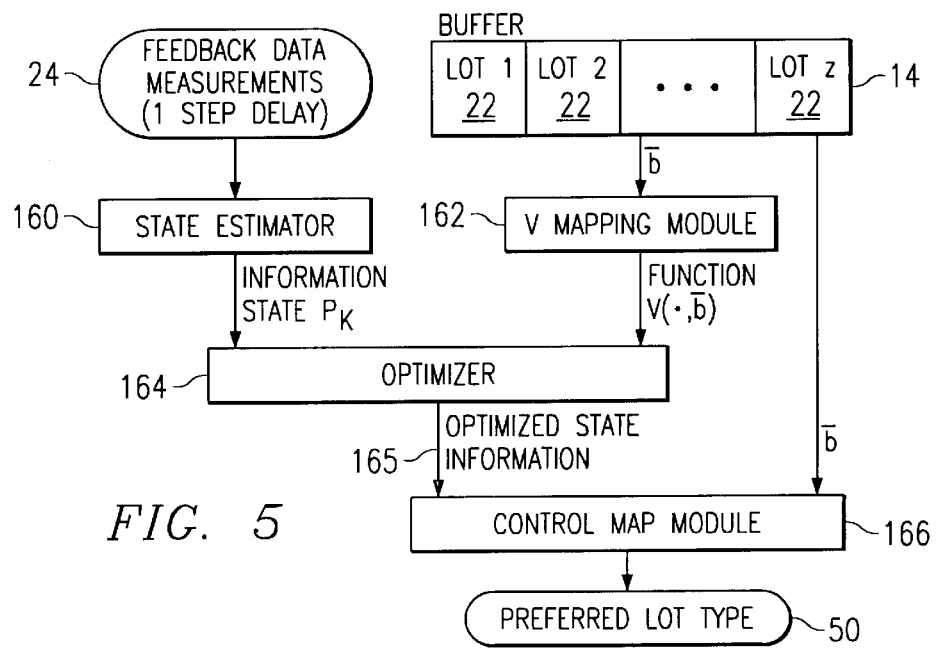
FIG. 5 is a block diagram illustrating additional details of the preferred lot type module of FIG. 2 in accordance with one embodiment of the present invention.

Referring to FIG. 5, details of preferred lot type module 46 are illustrated. Preferred lot type module 46 includes a state estimator 160, a V mapping module 162, an optimizer 164, and a control map module 166. In FIG. 5, the lots 22 in buffer 14 are represented by a $\bar{b}$.

The inputs to preferred lot type module 46 are feedback data measurements from metrics history and switching cost data 44 and the lots 22 from the buffer 14 ($\bar{b}$). The feedback data measurements from metric history and switching cost data 44 are supplied by feedback data 24. Since feedback data 24 is recursive, there is a one step delay between the current processing and the feedback data measurements 24. The feedback data measurements 24 are fed to a state estimator 160. In the exemplary embodiment state estimator 160 is implemented by an equation (4) in general or an equation (17) more specifically as described in more detail below. The output of state estimator 160 is an information state ($p_k$). Equation (4) is a cost biased estimator which is optimal for solving a dynamic game equation (3).

At the same time, the buffer value ($\bar{b}$) is fed to V mapping module 162 that outputs a function V (.,$\bar{b}$). The V mapping module 162 is constructed by solving an equation (7) and storing the solution V for later retrieval as described in more detail below. This function V(.,$\bar{b}$) and the information state $p_k$(.,$\bar{b}$) are fed to an optimizer 164. In the exemplary embodiment optimizer 164 is implemented by an equation (8) as described in further detail below. Optimizer 164 generates an optimized state estimate 165.

Via the dynamic programming principle, V(.,$\bar{b}$) represents the best worst-case cost to go, and $p_k$(.,) represents the worst-case cost, up to time k, given measurements and inputs from and to work cell 10. By maximizing the sum of the two costs, one tries to gauge the value of the state that would have resulted if the disturbances were behaving in a worse-case sense. The states estimated by state estimator 160 are frozen until a lot belonging to the specific machine/model combination being processed by preferred lot type module 46 is run. At that time, the process illustrated by state estimator 160, V mapping module 162, and optimizer 164 is performed.

The optimized state estimate 165 from optimizer 164 and the lots 22 in buffer 14 ($\bar{b}$) are forwarded to control map module 166 that includes the control map ($u_f$) obtained from solving equation (7) as described in more detail below. From optimization theory, this represents the best action to take given the state $x_k$ and the buffer state $b_k$. The output of control map module 166 is the preferred lot type 50 that should be run next from all the lots 22 of a particular model in buffer 14 for optimal performance.

Following is an exemplary embodiment of selecting a preferred lot type 50. First, notation used in describing the exemplary embodiment is introduced.

|·| denotes the Eucledian norm.
||·|| denotes the $l^2$ norm.
| denotes the reals.
J denotes integers.

$J_+$ denotes nonnegative integers.
$B^n = \{b : b \in \mathbb{S} \setminus 0^n\}$.
$x^{(i)}$ denote the $i^{th}$ element of vector $x \in \square^n$.

For $x, y \in \square^n$, $x \succeq y$ if $y^{(i)} = 0$ whenever $x^{(i)} = 0$, $i = 1, \ldots, n$. Also, $x \succ y$ if $\succeq y$, and $\exists_j \in \{1, \ldots, n\}$ such that $y^{(j)} = 0$ but $x^{(j)} \neq 0$. $\succ$, $\succeq$ are similarly defined.
$\overline{1}_n$ is the vector $[1\ 1\ 1\ \ldots\ 1]^T \in |^n$.
$e_i^n$ is the $i^{th}$ basis vector in $|^n$.
$x_{i,j}$ and $x_{[i,j]}$ denote a sequence $\{x_i, x_1, \ldots; x_j,\}$.
$l_{[0,\kappa]}^2$ denotes the set of sequences $\{x_{0,k} : \|x\|$ is finite$\}$.
$<x>$ denotes the dimension of a vector x.

For $b \in B^n$ define $$U_m(b) = \left\{ \sum_{i=1}^n \alpha_i e_i : 0 < \sum_{i=1}^n \alpha_i \leq m, \alpha_i \in \mathbb{S}, b^{(i)} \geq \alpha_i, i = 1, \ldots, n \right\}.$$

$\pi(N)$ denotes the set of all possible permutations of $\{1, 2, \ldots, N\}$. The supremum and infimum over an empty set are noted by negative infinity (–4) and positive infinity (+4), respectively.

Single Machine Case
The system under consideration is defined as:

$$\sum \begin{cases} x_{k+1} = f(x_k, u_k w_k), x_0 = \bar{x} \\ y_{k+1} = g(x_k, u_k w_k) \\ z_{k+1} = l(x_k, u_k w_k) \\ b_{k+1} = b_k - u_k + \eta_k, b_0 = b, k = 0, 1, \ldots \end{cases} \quad [1]$$

where $x_k \in |^n$ are the states, $u_k \in U_1(b_k)$ is the specific lot that was chosen for run k, $y_k \in |^t$ are the measurements, $w_k \in |^r$ and $\eta_k \in |^s$ are exogenous disturbances, $b_k \in B^s$ is the buffer, and $z_k \in |^q$ are the quantities we want to regulate.

The dynamics f denote the recursions for both the controller, and any weighting filters on the disturbances driving the process. The output map g is typically a model based on response surfaces. l is the quantity we want to control, and it typically represents targeting errors. The buffer $b_k$ is a listing of the number of different types of material available. The $i^{th}$ element of $b_k$, denoted $b_k^{(i)}$ is the number of lots of type i available for dispatch. Given M models, this listing can always be reordered such that $b_k^{(1)}, b_k^{(2)}, \ldots, b_k^{(i_1)}$ belong to model 1, $b_k^{(i_1+1)}, \ldots, b_k^{(i_2)}$ to model 2, and so on up to model M.

$\eta_k$ denotes lots of different types added or deleted by the scheduler. We allow deletion to handle, for example, priority lots, in which case the scheduler pulls all non-priority lots out of the buffer and forces the dispatcher to allocate priority lots only.

Let us define the set of sufficiently full buffers $\Lambda_s^m$ as by $$\Lambda_s^m = \{b \in B^s : b^{(i)} \geq m, i = 1, \ldots, s\}$$

\*\*\*\*\*\* for some $m > 0$. Let there also exist a function $\vartheta : B^s \times U(B^s) \times \mathbb{S} \to \square^*$. Define the set $\Psi_{(0,\infty)}^s(b, u) = \{\eta_{(0,\infty)} \in \mathbb{S}_{(0,\infty)} : \|\vartheta(b, u, \eta)\| < \infty\}$. We will assume that $x = 0$ is an equilibrium point for the system. Namely, there exists a $u_\phi \in U_1(\Lambda_s^m)$ such that $f(0, u_\phi, 0) = 0$ $l(0, u_\phi, 0) = 0$.

Also, let $N_{100} = \{\eta \in \mathbb{S}_{(0,\infty)} : \vartheta(b, u, \eta) = 0, b \in B^s, u \in U_1(B^s)\}$.

We now state basic assumptions that capture the dispatch process, and impose a detectability condition on the system (1):

A1. The dispatcher is required to dispatch only one machine at a time.
A2. Detectability. If $z_k \to 0$ as $k \to \infty$, then $x_k \to 0$ as $k \to \infty$.

Assumption A2 is required to infer stability in measurement feedback control problems, and is weaker than observability. Assumption A1 implies that the system iterates only when a request for material is received by the dispatcher. At that time, the cost contributed by the machine is accounted for. This assumption makes sense in an environment where the dispatcher maintains a queue of requests it is being asked to service, and takes up one request at a time.

Let ⓓ denote the space of non-anticipating measurement feedback policies, i.e. policies based on observations of the outputs y, the buffer b, and performance z alone (and not the system states x). The objective we are trying to achieve can now be stated as follows. Given a $\gamma > 0$, find a dispatch policy $u^* \in ⓓ$ such that the following two conditions are satisfied:
C1. If $x_0 = 0$, and $b_0 \in \Lambda_s^m$ then for any $b \in B_{[0,\infty)}^s$, $$\sup_{w \in l_{[0,\infty]}^2, \eta \in \Psi_{[0,\infty)}^s(b, u^*), w, \vartheta(b, u^*, \eta) \neq 0} \frac{\|z\|^2}{\|w\|^2 + \|\vartheta(b, u^*, \eta)\|^2} \leq \gamma^2. \quad [2]$$

C2. If $w = 0$, and $\eta \in N_\phi$ then for any $x_o \in \square^n$, we have $x_k \to 0$ as $k \to \infty$ Condition C1 denotes that starting from equilibrium, and with sufficiently full buffers, the $l^2$ gain of the system from the disturbances to the regulated output is bounded by $\gamma$. This is also the nonlinear H∞ condition [9]. Condition C2 deals with system stability in the absence of any disturbances. The minimizing (sub-optimal) value of $\gamma$ in C1 can be obtained via a bisection search.

One would have preferred to minimize the $l^\infty$ norm of the regulated output [2], but given that the buffers are typically unbounded, one ends up with minimizing the $l^\infty$ norm assuming (fictitious) bounds on the buffer. However, how one should impose such bounds is not very clear at this time. The $l^2$ solution, as we shall see is surprisingly independent of the actual buffer contents.

The Multi-Machine Case

One aspect of the multi-machine case not found in the single machine case is contention for the finite buffer b. This induces coupling between the individual solutions. Given our impetus for deriving indexed policies this is particularly disturbing. In this case the quantity of various lot types in the buffer does matter, since a specific machine could face starvation, and due to the non-idling requirement be forced into a highly non-optimal allocation. As intuitive behavior that one would desire is to spread high running types across all machines, keeping them well sampled. For low running material it makes sense to focus in on a limited number of machines. This ensures that sampling rates for these are reasonably high, and minimizes the risk of misprocess by due to running on a machine which has never run this material type before. The control policies can be designed to account for this on a limited basis. We say limited, since the dispatcher has no knowledge of the product mix, and the only information it gets regarding this mix is what it sees in its buffer. Thus a spurt in a typically low running material type could fill up the buffer, and the dispatcher has no option (due to non-idling requirements) but to spread this material out across multiple machines.

The multi-machine case will also involve ensuring that the $l^2$ gain criteria C1, and stability C2 are met. However, in this case we need to ensure that all machine-model combinations get sampled infinitely often for the stability requirement to make sense. One way to ensure this is to restrict $b_k \epsilon B^s$ such that $b_k^{(i)} \geq m, i=1, \ldots, s$, where m is the number of machines. This is clearly a very strong condition and we will refrain from requiring it to hold. Instead we argue that one need only consider those machine-model combinations that are run infinitely often. The other machine-model combinations represent system transients and do not influence stability, or the $l^2$ gain after a period of time.

Review of General Solution and Certainty Equivalence

The solution to the nonlinear $l^2$ gain problem involves reposing the original problem as a soft-constrained dynamic game:

$$\inf_{u \in \mathcal{D}, \eta \in \psi^s_{[0,\infty)(b,u)}, w \in l^2_{[0,28)}} \sup \left\{ \sum_{k=0}^{\infty} (|l(x_k, u_k, w_k)|^2 - \right. \quad [3]$$

$$\left. (\gamma^2 (|w_k|^2 + \vartheta(b_k, u_k, \eta_k)|^2)) \right\}.$$

At any time k>0, let $y_{1,k+1}$ be the measurement trajectory, $b_{0,k}$ denote the buffer trajectory, and (equation) be the (observable) trajectory of buffer disturbances. Let E* denote the space of functions $$p: |^n \to | \cup \{+\infty\}.$$

Then the information state $p_k \epsilon E^*$ for the system ($\Sigma$) is defined as:

$$p_{k=1}(x,b) = \quad [4]$$

$$\begin{cases} \begin{bmatrix} \sup_{\xi \in \square^n} \{p_k(\xi, b_k) + \sup_{w \in \square^r} (|l(\xi, u_k, w)|^2 - \gamma^2 (|w|^2 + \\ |\vartheta(b_k, u_k, n_k)|^2): x = f(\xi, u_k, w), y_{k+1} = g(\xi, u_k, w)): \\ x \in \square^n, b \in B^s \} \\ b_k + \eta_k \end{bmatrix} \\ -\infty \text{ else} \end{cases}$$

with $p_0 \epsilon E^*$. We can write [4] succinctly as a functional recursion $$p_{k+1} = H(p_k, u_k, y_{k+1}, \eta_k). \quad [5]$$

Denote by $\rho_b(p)$ the (b+$\eta$) component of p in (4). Then the solution to the measurement feedback problem involves solving the following infinite dimensional dynamic programming equation $$W(p) = \inf_{u \in U_m(\rho_b(p))} \sup_{y \in \square} \sup_{t_{\eta \in T} \square^s} \{W(H(p, u, y, \eta))\}. \quad [6]$$

In particular, equation [6] with additional side conditions is both a necessary and sufficient condition for the solvability of the measurement feedback $l^2$ gain problem. The catch of course being that it is infinite dimensional in general.

This infinite dimmensionality has motivated search for output injection schemes based on certainty equivalence [8]. The certainty equivalence controller involves first solving the state feedback problem, and using the upper value function for this problem to approximate the upper value function for the output feedback dynamic programming equation [6]. The state feedback problem (i.e. the states x are also observed) involves the existence of a function V: $|^n x B^s \to |^*$ with the following properties: (i) V(x,b)$\geq$0 for all $x \epsilon \square^n$, $b \epsilon B^s$, (ii) V(0,b)=0, for all $b \epsilon \Lambda_s^m$, and V satisfies $$V(x,b) = \inf_{u \in U_m(b)} \sup_{w \in {}^r, \eta \in \square^s} \{|l(x,u,w)|^2 - \quad [7]$$

$$\gamma^2 (|w|^2 + |\vartheta(b,u,\eta)|^2) + V(f(x,u,w), b+\eta-u)\}$$

with V(x,b)=$-\infty$ for all $b \notin B^s$. For any $x \epsilon \square^n$, and $b \epsilon B^s$ we define the state feedback policy $u_F$ to be $u_F(x,b)$ the value of u that infimizes the right hand side in [7]. Then at any time k given $p_k$, the information state, and V, one computes the estimate $$\hat{x}_k \epsilon \arg \max_{x \in \square^n} \{p_k(x, b_k) + V(x, b_k)\} \quad [8]$$

and uses the control action $u_k = u_F(\hat{x}_k, b_k)$. Conditions for the optimality and uniqueness of certainty equivalence controllers exist [1].

The state feedback problem [7] can be solved, for example, via the method of value iteration. This is typically done off-line, and the control policy and upper value function stored either via table look-up [15], linear approximations, or nonlinear functional approximation (e.g. neuro-dynamic programming [4]).

It appears that one still has a computationally hard problem given the fact that vector b is countably infinite. However, we will show in the next section that the buffer adds very little to the complexity of the original state feedback problem. Furthermore, in the discussion of Output Injection below, we will show that for the types of problems under consideration, not only does the information state have a nice finite dimensional parameterization, but it can also be propagated efficiently.

Figure 6:
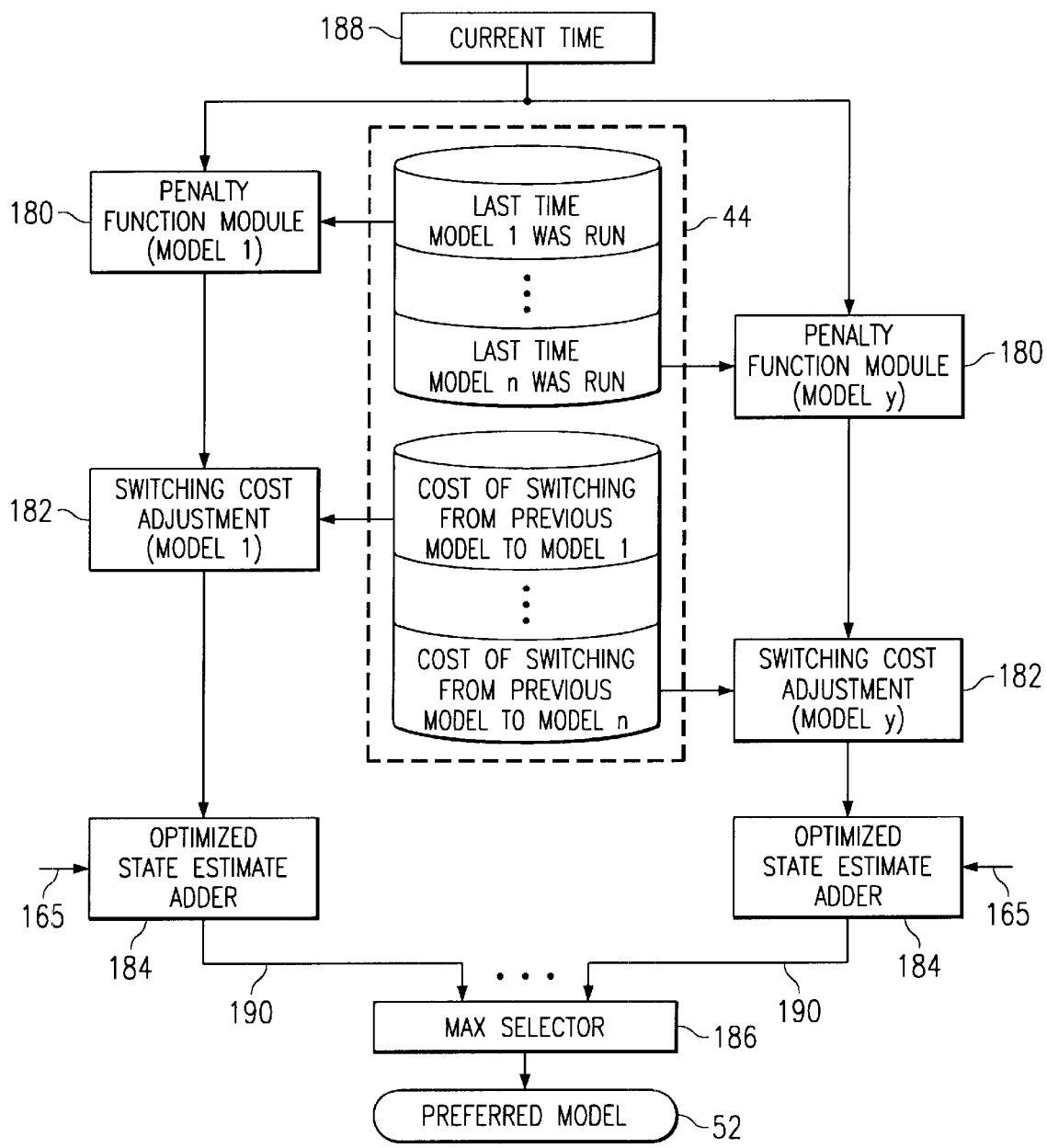
FIG. 6 is a block diagram illustrating additional details of the preferred model module of FIG. 2 in accordance with one embodiment of the present invention.

Referring to FIG. 6, details of preferred model module 48 are illustrated. Preferred model module 48 includes a penalty function module 180, a switching cost adjustment module 182, and an optimized state estimate adder 165 for each model of the associated machine preference module 40. Preferred model module 48 also includes a max selector 186 for selecting the preferred model 52 from the penalized and adjusted optimized state estimate 165 for each preferred model 52 and associated preferred lot type 50. The input to the max selector 186 for the selected preferred model 52 is the upper value function for that machine/model combination.

For a particular model, penalty function module 180 obtains the last time that model was run from metrics history and switching cost data 44 and compares it to the current time 188 to determine the elapsed time since the last run of the particular model. This elapsed time is fed into a penalty function to determine a penalty value for penalizing the model for the time since the last run on that model.

Next, switching cost adjustment module 182 obtains the cost of switching from the previous model run on the associated machine 18 to the particular model being considered, and the switching cost is added to the penalty value determined in penalty function module 180. The penalty value and switching cost adjustment are added to the optimized state estimate 165 in optimized state estimate adder 184 to obtain a total model value 190. The resulting model value 190 from each model is forwarded to max selector 186 where the model with the maximum model value 190 is selected as the preferred model 52. In the exemplary embodiment, the max selector is implemented using theorem (3) as described in more detail below. Once the preferred model 52 is determined by max selector 186, the preferred lot type 50 associated with the preferred model 52 is coupled with the preferred model 52 to create a preferred model and lot type.

Following is an exemplary embodiment of preferred model module 48.

State Feedback Policies

The Review of General Solution Subsection essentially laid out the solution to the exact problem under the most general conditions. This section focuses on state feedback policies u∈S, i.e. policies based on complete information at any time k regarding the system states $x_k$, and the buffer contents $b_k$. The solution to the state feedback case is required to facilitate feedback via certainty equivalence. We place additional restrictions in order to simplify equation [7], and to ease selection of the next model to sample for the single machine case. We will employ the concept of uniform ordering to decouple the buffer in case of multiple machines, and show that these indeed have the desirable property or reducing the number of machines sampled for low running model types. We first consider the single machine, single model case. In this situation, the problem is to determine what lot type belonging to the model should be run next. After considering this case, we extend it to the case where we are not selecting across multiple models, however, still with a single machine. The last subsection then extends the results to the multi-machine case. Note that the single machine-single model case is the basic computational block for our dynamic dispatch policies. The solutions to the other cases are obtained by optimally ordering the single machine-single model solutions.

The approach followed yields a hierarchical distributed architecture where (i) each machine decides what model and lot type it needs to run next, and (ii) the dispatcher looks at all the machine requests, and optimally resolves contention for a limited supply of lots.

Single Machine-Single Model

In this subsection, we derive the structure of the value function, and optimal policies for the single machine-single model case. It turns out that this structure has tremendous computational implications. Since there is only 1 model, there are no issues with switching across models, or not sampling a model enough. The problem facing us is to come up with an appropriate plan for sampling the model in order to maximize controller performance. Note that in this case we will have $u_k \in U_1(b_k)$. We place additional assumptions on the form of the buffer penalty function $\vartheta$.

A3. $\vartheta(b,u,\eta) = \vartheta(b-u+\eta)$, i.e. we penalize $\eta$ based on the next buffer state.

Lemma 1. For all $b_1, b_2 \in B^s$, with $b_1 \succeq b_2$ the solution $V(x,b)$ to [7] satisfies $$V(x,b_2) \geq V(x,b_1), \forall x \in \square^n.$$

Proof. From [7] we have $$V(x,b_1) = \inf_{u \in U_1(b_1)} \sup_{w \in \square^r, \eta \in \diamondsuit^s} \{|l(x,u,w)|^2 - \gamma^2(|w|^2 + |\vartheta(b_1, -u+\eta)|^2) + V(f(x,u,w), b_1 - u + \eta)\}.$$

For any $\eta$ define $\eta^*$ such that $b_1 = b_2 - \eta + \eta^*$. Then $$V(x,b_1) = \inf_{u \in U_1(b_1)} \sup_{w \in \square^r, \eta \in \diamondsuit^s} \{|l(x,u,w)|^2 - \gamma^2(|w|^2 + |\vartheta(b_2, -u+\eta^*)|^2) + V(f(x,u,w), b_2 - u + \eta^*)\} \leq$$

$$\inf_{u \in U_1(b_2)} \sup_{w \in \square^r, \eta \in \diamondsuit^s} \{|l(x,u,w)|^2 - \gamma^2(|w|^2 + |\vartheta(b_2, -u+\eta^*)|^2) + V(f(x,u,w), b_2 - u + \eta^*)\} = V(x,b_2).$$

Corollary 1. For any $b_1, b_2 \in \Lambda_s^m$ and for any $x \in \square^n$, $V(x,b_1) = V(x,b_2)$ Proof. We have $b_1 \succeq b_2$, and $b_2 \succeq b_1$. The proof follows The following corollary has important implications on the structure of the optimal upper value function.

Corollary 2. For all $\alpha_1, \alpha_2 \in J_+$, $\alpha_1, \alpha_2 \neq 0$, and for any $i \in \{1, \ldots, s\}$ $$V(x, \alpha_1 e_i^s) = V(x, \alpha_2 e_i^s)$$

for any $x \in \square^n$.

Proof. Same as proof of corollary 1, noting that $\alpha_1 e_i^s \succeq \alpha_2 e_i^s$ and $\alpha_2 e_i^s \succeq \alpha_1 e_i^s$.

Lemma 2. Let $b = b_1 + b_2$ for any $b_1, b_2 \in B^s$. Then for any $x \in \square^n$, the solution $V(x,b)$ to equation [7] satisfies $$V(x,b) = \inf\{V(x,b_1), V(x,b_2)\}$$

Proof.

$$V(x,b) = \inf_{u \in U_1(b)} \sup_{w \in \square^r, \eta \in \diamondsuit^s} \{|l(x,u,w)|^2 - \gamma^2(|w|^2 + |\vartheta(b+\eta-u)|^2) + V(f(x,u,w), b+\eta-u)\}$$

$$= \inf_{u \in U_1(b_1+b_2)} \sup_{w \in \square^r, \eta \in \diamondsuit^s} \{|l(x,u,w)|^2 - \gamma^2(|w|^2 + |\vartheta(b_1+b_2+\eta-u)|^2) + V(f(x,u,w), b_1+b_2+\eta) - u)\}$$

$$= \inf\Big\{\inf_{u \in U_1(b_1)} \sup_{w \in \square^r, \eta \in \diamondsuit^s} \{|l(x,u,w)|^2 - \gamma^2(|w|^2 + |\vartheta(b_1+b_2+\eta-u)|^2) + V(f(x,u,w), b_1+b_2+\eta-u)\},$$

$$\inf_{u \in U_1(b_1)} \sup_{w \in \square^r, \eta \in \diamondsuit^s} \{|l(x,u,w)|^2 - \gamma^2(|w|^2 + |\vartheta(b_1+b_2+\eta-u)|^2) + V(f(x,u,w), b_1+b_2+\eta-u)\}\Big\}$$

Thus, $$V(x,b) = \inf\Big\{\inf_{u \in U_1(b_1)} \sup_{w \in \square^r, \eta^* \in \diamondsuit^s} \{|l(x,u,w)|^2 - \gamma^2(|w|^2 + |\vartheta(b+\eta^*-u)|^2) + V(f(x,u,w), b_1+\eta^*-u)\}, \inf_{u \in U_1(b_1)} \sup_{w \in \square^r, \eta \in \diamondsuit^s} \{|l(x,u,w)|^2 - \gamma^2(|w|^2 + |\vartheta(b_2+\overline{\eta}-u)|^2) + V(f(x,u,w), b_2+\overline{\eta}-u)\}\Big\}$$

$$= \inf\{V(x,b_1), V(x,b_2)\}.$$

The following theorem is the main representation result for the value function in terms of the buffer (b).

Theorem 1.

$$\text{Let } b = \sum_{i=1}^{s} \alpha_i e_1^s, \alpha_i \in \mathcal{Y}, i = 1, \ldots, s. \text{ Then}$$

-continued $$V(x, b) = \inf_{l \in \{1, \ldots, s\}} \{V(x, e_l^s) : \alpha_l \neq 0\}.$$

Proof. The proof follows via induction, and repeated application of lemma 2, and corollary 2. Let 2 of the elements of $\alpha$ be non zero. Then $b = \alpha e_1^s + \alpha_2 e_2^s$. By lemma 2, $$V(x, b) = \inf_{l \in \{1,2\}} \{V(x, \alpha_l e_l^s)\} = \inf_{l \in \{1,2\}} \{V(x, e_l^s)\} \text{ via corollary 2}.$$

Let this hold for the case where j−1 entries in a are non-zero. For the case where j entries are non-zero we have $$V(x, b) = \inf\left\{V(x, \alpha_j e_j^s), V\left(x, \sum_{i=1}^{j-1} \alpha_i e_i^s\right)\right\} \text{ via lemma 2}$$

$$= \inf\left\{V(x, e_j^s), \inf_{i \in \{1, \ldots, j-l\}} \{V(x, e_i^s)\}\right\} \text{ via induction hypothesis}$$

$$= \inf_{i \in \{1, \ldots, j\}} \{V(x, e_i^s)\}.$$

The values of i for which $\alpha_i = 0$ are excluded since $e_i^s$ does not contribute to b.

The alert reader will notice that theorem 1 gives a tremendous reduction in the computational complexity for solving [7]. Given that the buffer is s dimensional, one need not evaluate the upper value function for all possible (countably infinite) values of the buffer entries. One needs to only track values corresponding to specific lot types. The value of $V(x,b)$ for any b can be obtained from this finite set via Theorem 1.

We now consider two limiting cases of the buffer cost function $\vartheta$. These two correspond to the cases where (i) the buffer incurs no cost $\vartheta(b)=0$, and (ii) the buffer incurs infinite cost ($\vartheta(b)=\infty$) for all $b \succeq \bar{1}_s$.

Theorem 2. Consider $V(x,b)$ the solution to [7], and assumption A3. If
i. Let $\vartheta(b)=0$ for all $b \in B^s$. Then $V(x,b)$ satisfies $$V(x, b) = \inf_{u \in U} \sup_{l(b)w \in e^r} \left\{|l(x, u, w)|^2 - \gamma^2|w|^2 + \sup_{l=1,\ldots,s} \{V(x, e_l^s)\}\right\}.$$  [9]

ii. Let ($\vartheta(b)=\infty$) for all $b \succ \bar{1}_s$. Then $V(x,b)$ satisfies $$V(x, b) = \inf_{u \in U} \sup_{l(b)w \in e^r} \left\{|l(x, u, w)|^2 - \gamma^2|w|^2 + \inf_{i=1,\ldots,s} \{V(x, e_i^s)\}\right\}.$$  [10]

Equation [9] refers to the case where no buffer penalties are considered. This is the typical case found commonly in practice. Equation [10] considers the other extreme, where infinite penalty is imposed on the buffer whenever it leaves $\Lambda_s^1$. Let $\bar{\gamma}$ be the infimizing value of $\gamma$ that ensures that $V(0,b_0)=0$ for $b_0 \in \Lambda_s^1$ in [9], and let $\underline{\gamma}$ be the infimizing value that achieves $V(0,b_0)=0$ for $b_0 \in \Lambda_s^1$ in [10]. Then we have $\bar{\gamma} \geq \underline{\gamma}$.

Single Machine-Multiple Models

We now consider the case where the machine could run one of M possible models at any given time. Given the current (at time k) buffer states $\{b_i,k\}_{i=1}^M$, and current states $\{x_i,k\}_{i=1}^M$ let the individual upper value functions be denoted by $\{V_i(x_{i,k},b_i)\}_{i=1}^M$. At any given time, assuming that we know the states, we will simply write these as $V_i$.

Where there is no ambiguity, we will drop the model subscript. In that case, it is assumed that the states, and buffers under question are restricted to the model being considered.

For each model i consider the following function for any policy $u \in S$, $$J_i^k(x, b; u) = \sup_{w \in l_{[k,\infty)}^2, \eta \in \Psi_{[k,\infty)}^{S_i}(\hat{b},u)} \left\{a_k^i + \sum_{j=k}^{\infty} (|l^i(x_j, u_j, w_j)|^2 - \gamma^2(|w_j|^2 + |\theta^i(\hat{b}_j, u_j \eta_j)|^2)) : x_k = x, \hat{b}_k = b\right\}.$$  [11]

Then by the dynamic programming principle, $\alpha_k^i + V_i(x, b) = \inf_{u \in S} J_i(x,b,u)$. Hence for the multi-model case we uniformize the problem by asking that the policy $u \in S$ solve $$\inf_{u \in S} \sup_{l \in \{1,\ldots,M\}} \{J_l^k(x, b; u)\}.$$  [12]

Lemma 3. Given $V_i(x,b)$ the upper value functions for the individual models, the optimal model $j_k^*$ to run next, given $x_k$ and $b_k$ is $$j_k^* \in \arg\max_{i \in \{1,\ldots,M\}} \{a_k^i + V_i(x_k, b_k)\}$$

Proof. The result of the theorem follows from the dynamic programming principle, and the mutually exclusive nature of the models, i.e. the machine can only run one model at a time.

Switching costs and performance degradation

We now discuss how switching costs, and performance degradation on idle are incorporated into determining the next model to run. Given that model i incurred the last run, the model j is being chosen for the current run, model i incurs a switching cost $c_{ij} \geq 0$. Also, $c_{ii}=0$, for all models i 0 $\{1, \ldots, M\}$.

Note that the cost of switching across types within a model can be accommodated in l, and we shall not concern ourselves with this cost here.

We are also assuming that the states of inactive models are frozen, because no additional information regarding an inactive model is available since it was last run. However, in practice there will be performance degradation. The effect of this is to bump up the cost to go. We will denote this increase by a stage cost $\tau_i(k,k_i) \geq 0$, where $k_i$ is the run index at which the switch from model i to another $j \neq i$ took place. Also, $\tau_i(k_i, k_i)=0$. At a given time k, the total degradation for model i is denoted by:

$$\tau(k, k_i) = \sum_{h=k_i}^{k} \tau_i(h, k_i)$$

Now let i be the model active in the last run. For any model j with $j \neq i$ we set $a_k^j = \tau_j(k,k_j)$. For model i we set $a_k^i = c_{ij}$ where j is the model that is chosen in the current run.

Theorem 3. Suppose model i was run at time k−1, the optimal model to run at time k, given $x_k$ and $b_k$ is $$arg\max_{i,j}\{V_i(x_k, b_x) + c_{i,j}, V_j(x_k, b_k) + \tau_j(k, k_j)\} = arg\max_{i,j}\{V_i(x_k, b_k), V_j(x_k, b_k) + \tau_j(k, k_j) - c_{ij}\}$$

$$= arg\max_{i,j}\{V_i(x_k, b_k) + \overline{\tau}_i(k, k_i) - c_n, V_j(x_k, b_k + \tau_j(k, k_j) - c_{ij}\}$$

since $\overline{\tau}_i(k, k_i) = c_n = 0$.

Proof. Follows from lemma 3, and the fact that for any j, $$\tau_i(k, k_i) = \begin{cases} 0 & \text{if } k \le k_i \\ \alpha e^{\delta(k-k_i)}, \alpha \in \square_+, \delta \in \square & \text{else.} \end{cases}$$

Here we briefly discuss the form of $\tau_i(k, k_i)$. One such function is $$j_{k|i}^* \in arg\max_{j \in \{1,\ldots,M\}}\{V_j(x_k, b_k) + \overline{\tau}_j(k, k_j) - c_{ij}\}$$

The factor $\forall$ denotes the rate of degradation, and $\delta$ denotes the urgency one feels to run an idle model. For $\delta > 0$, as $k - k_i$ increases, the single state cost $\tau_i(k, k_i)$ also increases, tending to 4. For $\delta < 0$, as $k - k_i$ increases, the single stage cost $\tau_i(k, k_i)$ decreases, and tends to 0. Hence we have for the cumulative cost $\overline{\tau}_i(k, k_i)$, $$\overline{\tau}_i(k, k_i) = \begin{cases} 0 & \text{if } k < k_i \\ \alpha(k - k_i) & \text{if } \delta = 0, k \ge k_i \\ \alpha e^{\delta}\left(\frac{1 - e^{(k-k_i)\delta}}{1 - e^\delta}\right) & \text{if } \delta \ne 0, k \ge k_i. \end{cases}$$

Multiple Machines-Multiple Models

We now come to the general case, where the workstation has multiple machines $\{1, \ldots, m\}$, and each machine can run multiple models. Without loss of generality we will assume that each machine can run any of M models. This assumption is made only in order to simplify the notation. Note that unlike the single machine cases considered thus far, the event that a given model runs is no longer mutually exclusive, since the different machines could run different models, or contend for a limited supply of lots belonging to a single model. This results in coupling between the policies.

In what follows, we assume that there are sufficiently many lots available, so that if all the machines were to ask for material, there would be no idling. In addition, we assume that we are allowed to reserve lots to be run on machines that need to sample a given model the most. In case the number of lots falls below m, this could result in a machine being idled, since the lot is being held for another machine to run. A special case is that of hot (priority) lots, which are assumed to be an exception, and allocated the idle machine. In case a priori information is available about the arrival of a hot lot, the appropriate machine could be idle and waiting for processing. There is also an issue of how one should run low volume models. The cleanest way of dealing with this is to ensure that one is only allowed to run it on a limited number of machines. The dispatcher has no knowledge of the actual volume mix in the fab since all it sees are its buffers. However, the policies derived here do ensure soft dedication.

Let the buffer at time k be given by $b_k \in B^s$. Let $W_k^i(b_k)$ denote the upper value function, including degradation and switching costs, picked by machine i at time k, given a buffer $b_k$. $W_k^i(b_k)$ is given by theorem 3, $$W_k^i(b_k) = \max_{j_2 \in \{1,\ldots,M\}}\{V_{j_2}^i(x_k, b_k) + \overline{\tau}_{j_2}^i(k, k_j) - c_{j_1 j_2}^i :$$

$j_1$ = model run at time $k = 1\}$ where $V^i, \overline{\tau}^i$, and $c^i$ indicate that these functions correspond to models for machine i. We are ignoring the states $x_k$ in the expression of $W_k^i$, since although they do determine the value of $W_k^i$, they are assumed frozen during this assignment phase. Let $u_i \in U_1(b_k)$ denote the lot type (and model) selected by machine i at time k from buffer $b_k$. The space of assignment policies for the multi-machine case is denoted by $U_1^m(b_k)$ and is defined by $$U_1^m(b_k) = \left\{u \in \diamondsuit^{s \times m} : \sum_{t=1}^s u_{i,\cdot} = 1; \sum_{i=1}^m u_{j,i} \le b_k^{(j)}, j = 1, \ldots, s\right\}$$

The set $U_1^m(b_k)$ has as its columns the vector $u_{\cdot,i}$ chosen for each machine. Clearly, each of these columns has to sum to 1, since each machine can only run 1 lot type at a time. Also, the sum across each row denotes the total number of lots of a specific type selected, and this cannot be greater than the number of lots of that specific type available in the buffer.

The aim of the assignment problem can now be stated as follows:

Find a permutation $\kappa^*(b_k)$ of the machines so that the following is achieved.

$$\kappa^*(b_k) \in arg\min_{\pi(m) \in \{1,\ldots,m\}}\max\left\{W_k^{\pi_i(m)}\left(b_k - \sum_{j=1}^i u_{\pi_{j-1}(m)}\right)\right\} \quad [13]$$

where $u_{\pi_0(m)} = \phi$. Then $u_k \in U_1^m(b_k)$ can be determined as follows. Start with $\kappa^*(b_k)^{(1)}$ and assign that machine with the lot of its choosing (say $u_{\kappa^*(b_k)^{(1)}}$). Now assign the lot chosen by machine $\kappa^*(b_k)^{(2)}$, with the buffer value $b_k - u_{\kappa^*(b_k)^{(1)}}$. Let this lot be denoted by $u_{\kappa^*(b_k)^{(2)}}$. Next assign $\kappa^*(b_k)^{(3)}$ with the lot type of its choice given buffer $b_k - u_{\kappa^*(b_k)^{(1)}} - u_{\kappa^*(b_k)^{(2)}}$. Repeat this procedure until $\kappa^*(b_k)^{(m)}$ has been assigned.

Consider the following dynamic programming equation $$Z_{m-1}(b_k, M_{m-1}) = \min_{i \in M_{m-1}}\max\{W_k^i(b_k), Z_m(b_k - u_i(b_k), M_m \setminus i)\}$$

-continued $$= \min_{i_{m-1} \in M_{m-1}} \max\left\{W_k^{i_{m-1}}(b_k), \min_{i_m \in \{M_{m-1} \setminus i_{m-1}\}} W_k^{i_m}(b_k - u_{i_{m-1}}(b_k))\right\}$$

$$\min_{i_m, i_{m-1} \in M_{m-1}} \max\{W_k^{i_{m-1}}(b_k), W_k^{i_m}(b_k - u_{i_{m-1}}(b_k))\}$$

Theorem 4. Suppose there exists a solution to Z to the dynamic programming equation [14], and let $i_j$ be the minimizing value of i on the RHS. Consider the sequence $\{Z_j(b_k-u_{i_j}, M_j)\}_{j=1}^{m}$. Then $\kappa(b_k)=\{i_1, \ldots, i_m\}$ is a solution to [13].

Proof. We prove this assertion via an induction argument. For j=m−1 one has $$Z_j(b_k, M_j) = \min_{i_j \in M_j} \max\{W_k^{i_j}(b_k), Z_{j+1}(b_k - u_{i_j}(b_k), M_{i_j} \setminus i)\}$$

$$= \min_{i_j \in M_j} \max\left\{W_k^{i_j}(b_k), \min_{i_{j+1}, \ldots, i_m} \max_{q \in \{i_{j+1}, \ldots, i_m\}} \left\{W_k^q\left(b_k - \sum_{i=j+1}^{q} u_{i_l}\right)\right\}\right\}:$$

$$= \min_{i_j, \ldots, i_m \in M_j} \max_{q \in \{i_j, \ldots, i_m\}} \left\{W_k^q\left(b_k - \sum_{l=j}^{q} u_{i_l}\right)\right\}.$$

This shows that an optimal 2 element sequence is picked with elements from $b_k$. Assume this holds for j+1. Then for j we have $$Z_j(b, M_j) = \min_{i \in M_j} \max\{W^i(b), Z_{j+1}(b - u_i(b), M_j \mid i)\} \quad [14]$$

$$j = 1, \ldots, m-1$$

$$Z_m(b, M_m) = \min_{i \in M_m} W^i(b), b \in B^s, M_m \subset M_j \subset M_1$$

$$= \{1, 2, \ldots, m\}.$$

In the general case the dynamic programming equation is in the class NP. However, it does substantially reduce the complexity of the original problem. To estimate the complexity note that we have to execute m iterations in [14]. The total steps ($S_{m,b}$) we have to execute are $$S_{m,b} = \sum_{j=1}^{m} (m - j + 1) C_{m-j+1}^{m} \langle b \rangle m$$

$$= \sum_{j=1}^{m} (m - j + 1) \frac{m!}{(m - j + 1)!(j - 1)!} \langle b \rangle m$$

which in the loop corresponding to j=m/2 yields $$\frac{m!}{(m/2)!(m/2)!} \langle b \rangle m.$$

This shows that the complexity of solving [14] is at least $O(2^m \langle b \rangle m)$.

Although the dynamic programming equation [14] gives the optimal allocation over all models it is computationally intractable for real-time applications. One could argue that Z and its associated policy be computed off-line, and stored. However, given the possible number of machines, and buffer sizes the complexity would still be enormous, and would be a extremely difficult to maintain, especially if additional machines or models are introduced on a regular basis.

Consider the case where the idling machine j is requesting a lot from model $v_1$, and we want to restrict allocation to machines requesting lots from $v_1$ alone. Let $b_k^{v_1}$ denote the buffer $b_k$ restricted to lots belonging to model $v_1$. We can start solving the dynamic programming recursion (14) by setting $b_k=b_k^{v_1}$. If the machine j is allocated we stop, else we next pick the model $v_2$ which is the model of choice for $W_k^j(b_k-b_k^{v_1})$, and repeat the allocation procedure on machines requesting model $v_2$. This is continued until machine j is assigned a lot. This substantially cuts down the complexity associated with solving [14]. Note however, that this is not an optimal solution by virtue of the fact that we preclude non-idle machines from switching to model $v_1$. Below we consider a special case, which under the assumption of uniformly ordered costs yields an optimal polynomial time allocation rule.

Single Model Allocation and Uniform Ordering

Let $\tau_v$ denote the set of types for a model v, with $T_v=\langle\tau_v\rangle$. Suppose at time k, we have $m_v$ machines that opt for a lot from model v, with their individual value functions denoted by $W_k^i, i=1, \ldots, m_v$. Let $b_k^v$ denote the buffer $b_k$ restricted to model v. We now define the concept of a uniform ordering amongst the these value functions.

Let $W_k^i(b_k^v)$ and $W_k^j(b_k^v)$ denote the upper value functions for the 2 machines for model v. We say that these 2 costs $W_k^i$ and $W_k^j$ are uniformly ordered, if one of the following holds $$W_k^i(b_k^v) \leq W_k^j(b_k^v) \text{ or } W_k^i(b_k^v) \geq W_k^j(b_k^v), \forall b_k^v \in B^{t_v}. \quad [15]$$

One could justify this assumption on the basis that sine all machines are requesting lot types in order to uniformly bound individual model costs [12], a machine will either be uniformly better than another one for a given model type, or be uniformly worse.

The following lemma captures general properties of the function $W_k^i$

Lemma 4. Consider $W_k^i(b_k)$, and assume that the optimal lot request corresponds to model v. Let $b_k^v$ denote the buffer $b_k$ restricted to model v, and assume that $b_k^v$ has more than 1 lot available. Then the following inequalities follow:
i. $W_k^i(b_k-u) \geq W_k^i(b_k)$ for all $u \in U_1(b_k^v)$
ii. $W_k^i(b-b_k^v) \leq W_k^i(b_k)$ The following lemma is then used to justify the indexed policy for a single model case.

Lemma 5. Assume machines i and j are requesting an assignment for model v. Further assume that at least 2 lots are available from model v. Let $\mu_1$ be $$\mu_1 \in \arg\max_{\mu \in \{i,j\}} \{W_k^\mu(b_k^v)\}$$

and let $\mu_2$ be the remaining machine index. Then, if $W_k^i$ and $W_k^j$ are uniformly ordered, we have $$\max\{W_k^{\mu_1}(b_k^v), W_k^{\mu_2}(b_k^v - u_{\mu_1}(b_k^v))\} \leq \max\{W_k^{\mu_2}(b_k^v), W_k^{\mu_1}(b_k^v - u_{\mu_2}(b_k^v))\}.$$

Proof. First note that by lemma 4

$$W_k^i(b_k^v) \leq W_k^i(b_k^v - u), u \in U_1(b_k^v).$$

Consider the following cases:
i. If $u_{\mu_1}(b_k^v) \neq u_{\mu_2}(b_k^v)$ we have $$W_k^{\mu_2}(b_k^v - u_{\mu_1}(b_k^v)) = W_k^{\mu_2}(b_k^v) \leq W_k^{\mu_1}(b_k^v) = W_k^{\mu_2}(b_k^v - u_{\mu_1}(b_k^v)).$$

Hence the assertion of the lemma holds with equality.
ii. If $u_{\mu_1}(b_k^v) = u_{\mu_2}(b_k^v) = \bar{u}$ Then the assertion of the lemma holds if $$W_k^{\mu_2}(b_k^v - u_{\mu_1}(b_k^v)) = W_k^{\mu_2}(b_k^v - \bar{u}) \leq W_k^{\mu_1}(b_k^v - u_{\mu_2}(b_k^v)) = W_k^{\mu_1}(b_k^v - \bar{u}).$$

But the latter follows from the uniformly ordered assertion.

The following corollary is an immediate consequence of lemma 5, following from a pairwise interchange argument commonly found in scheduling theory [14].

Corollary 3. Assume that machines $1, \ldots, \mu$ are requesting model v. Assume that there are at least $\mu$ lots available in model v. Let the models be ordered such that $$W_k^1(b_k^v) \geq W_k^2(b_k^v) \geq \ldots \geq W_k^\mu(b_k^v).$$

If the costs are uniformly ordered, then the optimal lot allocation rule is to allocate machines in the sequence $1, 2, \ldots, \mu$.

Proof. The proof of this assertion follows via an induction argument coupled by a pairwise interchange.

We now derive, in a manner similar to lemma 5 and corollary 3, the appropriate allocation scheme in case the buffer is starved for lots of the model requested. Specifically, we look at the case where the number of lots ($\zeta$) of a model v are strictly less than the number of machines $\mu$ requesting lots from this model. An intuitive scheme would, for example allocate machines based on corollary 3, except for the $\mu-\zeta$ machines with the highest upper value functions $W_k^i(b_k^v)$. We now make this intuition precise.

Lemma 6. Let $W_k^1(b_k^v) \leq W_k^2(b_k^v) \leq W_k^3(b_k^v)$, and be uniformly ordered. Assume that these machines are each asking for lots from model v. Then $$\max\{W_k^2(b_k^v), W_k^1(b_k - u_2(b_k^v))\} \leq \max_{i \in \{1,2\}}\{W_k^3(b_k^v), W_k^i(b_k - u_1(b_k^v))\}.$$

Proof. If $u_2(b_k^v) \neq u_3(b_k^v)$ then $$W_k^1(b_k^v - u_2(b_k^v)) \leq W_k^3(b_k^v - u_2(b_k^v)) = W_k^3(b_k^v).$$

Hence the lemma follows. In case $u_2(b_k^v) = u_3(b_k^v)$ one has $$W_k^1(b_k^v - u_2(b_k^v)) = W_k^1(b_k^v - u_3(b_k^v)) \leq W_k^2(b_k^v - u_3(b_k^v)).$$

Since $W_k^2(b_k^v) \leq W_k^2(b_k^v - u_3(b_k^v))$ via lemma 4, the result follows.

As in case of corollary 3, the following result follows via induction and pairwise interchange.

Corollary 4. Let $W_k^1(b_k^v) \leq W_k^2(b_k^v) \leq \ldots \leq W_k^v(b_k^v)$ be the sequenced of uniformly ordered upper value functions.

Let there be $\zeta < \mu$ available lots in buffer $b_k^v$. Then the optimal allocation scheme is to allocate machines $1, 2, \ldots, \zeta$ using the ordered assignment in corollary 3, and to roll over the remaining $\mu-\zeta$ machines into another model.

Having stated this, we are now in a position to present a general algorithm for solving the allocation problem [13].

Following is an exemplary embodiment of arbitrator Polynomial Time Allocation Algorithm Suppose machine i requests a lot from model v. Then clearly, $W_k^1(b_k^v) = W_k^i(b_k)$. We will thus denote the buffer argument by restricting it to the specific model being requested. Also, let $\mathcal{B}_k^v$ denote the number of lots in buffer $b_k^v$ for model v. The algorithm can now be stated as follows:

Algorithm A

S1. Sort each model $v = 1, \ldots, M$ such that $$W_k^{11}(b_k^1) \leq W_k^{21}(b_k^1) \leq \ldots \leq W_k^{\zeta^1}(b_k^1)$$

$$W_k^{12}(b_k^2) \leq W_k^{22}(b_k^2) \leq \ldots \leq W_k^{\zeta^2}(b_k^2)$$

$$\vdots \ldots \leq \quad \ldots \leq \quad \ldots \vdots$$

$$W_k^{1M}(b_k^M) \leq W_k^{2M}(b_k^M) \leq \ldots \leq W_k^{\zeta^M}(b_k^M)$$

S2. If each model specific buffer $b_k^v$ has $\zeta_v$ lots, assign them according to corollary 3. Go to step S6.

S3. Assign all models v such that $\zeta_v > \mathcal{B}_v^v$ via corollary 4. Keep track of the max cost for the machines assigned $\{1_v, \ldots, \mathcal{B}_v^v\}$.

S4. Sort the buffers assigned in S3 by their max costs. Consider the model (or models) with the minimal max cost (denoted by v*). Freeze all allocations for this model (v*) and roll over unassigned machines into their next model and sort these models. Delete the machines assigned to model v* from the list of available machines. Delete the model v* from the list of models.

S5. If all machines are allocated or all buffers are empty, go to S6. Else, go to S2.

S6. Stop.

The algorithm presented above yields an optimal allocation under the uniformly ordered assumption. Furthermore, this algorithm has polynomial time complexity. Observing that at each iteration i (assuming only 1 machine got assigned in the previous one), the algorithm requires m−i+1 assignments in S3. Sorting M−i+1 models and sorting m−1 machines in step S4. This repeats for m iterations until all the machines are exhausted. Hence the number of operations $S_{m,M}$ is given by $$S_{m,M} = \sum_{i=1}^{m}(M-i+1)\log_2(M-i)\log_2(m-i)$$

and hence the complexity of the algorithm is $O(mM \log_2(M) + m^2 \log_2(m))$.

The complexity reduction from [14] is tremendous. Whereas the original dynamic programming problem had exponential complexity, the algorithm presented has only polynomial complexity.

Theorem 5. Assume that all the value functions $W_k^i$, $i = 1, \ldots, m$ are uniformly ordered. Then Algorithm A yields an optimal allocation and solves [13].

Proof. If all models have enough lots to satisfy requests, we have an optimal allocation via corollary 3. In case there is a model $M_1$ which cannot satisfy all requests, then by corollary 4 it makes sense to roll over those machines with the highest cost into another model. If these get rolled into $M_2$ then we need to make sure (as the algorithm does) that lots in $M_2$ are assigned after the machines are rolled over. If two models need their machines rolled over, then it again makes sense to allocate the lower cost model first, since by not doing so we have increased the lower bound on the achievable cost. These are exactly the sequence of actions taken by the algorithm.

The algorithm also makes clear an interesting property concerning infrequently run (low running) models. If the device types in a model are not run very frequently, one expects that there will be several machines requesting allocation from this model due to their increasing idling penalties ($\tau$). However, if a lot does show up, it gets allocated to the machine with the lowest cost. This machine then will run this model over a period of time. Hence, in case of low runners the allocation scheme introduces a natural soft dedication of machines. In case of multiple low running models, the machines chosen to run these will be picked according to the device mix seen by the dispatcher, which will try to maintain a sufficiently high sampling rate for all machines that run these models.

Following is an exemplary embodiment of state estimator 160.

Output Injection

In the previous section it was assumed that the state $x_k$ was known while computing the upper value function $V_j(x_k,b_k)$. We now consider the case where this state information is not directly observable. as mentioned in subsection 2.3 we need to maintain and propagate an information state [4], [5]. Given this information state, we can obtain an estimate of the state $x_k$ employing certainty equivalence [8]. In contrast to the upper value function $V_j$ which can be computed off-line and stored either in a table look-up, or via functional approximation (e.g. neural networks), the information state has to be propagated on-line. This makes the complexity of computing [4] critical. Below we present a system which is not only structured to suit applications in semiconductor manufacturing, but also yields a computationally efficient information state recursion.

It is clear that we need only propagate the information state, and estimate the state of the model that was run. The other models are assumed frozen, and all they incur is an idling penalty ($\tau$).

We will therefore focus our attention on a single model. The resulting recursion can be applied to any model that is run.

Information State Recursion

Consider the following system, which represents the behavior of a single model, and is a special case of [1]:

$$\sum_j \begin{cases} \theta_{k+1} = K(\chi_k, u_k)\theta_k + E(\chi_k, u_k)v_k & [16] \\ \chi_{k+1} = f(\chi_k, y_{k+1}, u_k) \\ y_{k+1} = g(\chi_k, u_k)^T \theta_k + G(\chi_k, u_k)w_k \\ z_{k+1} = l(y_{k+1}, u_k, \chi_k) \\ b_{k+1} = b_k - u_k + n_k, k = 0, 1, \ldots \end{cases}$$

Here $\theta_k$, $/^{n_1}$, $\chi_k/^{n_2}$, and represent components of the state $x_k$ Also, $v_k$, $/^{r_1}$ and $w_k$, $/^{r_2}$ represent the disturbances. The dimension of the other quantities are as in [1]. It is assumed that we are able to directly observe $x_k$. We however cannot observe $\theta_k$. In this set-up, $x_k$ represent the states of a supervisory controller that has been implemented on the process, with the function $f:\square^{n_2}x\square^l xU(B^s)\to\square^{n_2}$ denoting the controller dynamics. The matrix maps $$K:\square^{n_2}xU(B^s)\to\square^{n_1}x\square^{n_1}$$

$$E:\square^{n_2}xU(B^s)\to\square^{n_1}x\square^{r_1}$$

denote the controller state (and hence process setting) and lot type driven filtering on the process drift.

These can be used to loop-shape the closed-loop response of the dispatcher. The matrix valued function $$g:\square^{n_2}xU(B^s)\to\square^{n_1}x\square^l$$

represents a function relating the controller states (and hence the process setting), and the lot type to inputs into a regression fit parameterized by $\theta_k$. This encompasses not only multi-output linear models, but also multi-output nonlinear models. The matrix map $$G:\square^{n_2}xU(B^s)\to\square^l x\square^{r_2}$$

is used to capture the relative magnitudes of both the modeling error and measurement noise on each of the outputs. Lastly the function $$l:\square^l xU(B^s)\to\square^{n_2}x\square^m$$

denotes the vector of quantities we want to regulate and could include the error from target (via $y_{k+1}$ and $u_k$), as well as the cost of making changes in the process settings (via $\chi_k$).

We note that the system represented in [16] has greater generality than those found in typical supervisory control applications. For example, in case of single output plants where time is the controlled variable (e.g. deposition or etch), and a controller based on the EWMA filter [16] is employed $\chi_k$, $y_k$, and $z_k$ are all scalars. Furthermore, in this case, $K(\chi_k, u_k)=E(\chi_k, u_k)=G(\chi_k, u_k)=1$. Also, $g(\chi_k, u_k)=[1\ Fu_k,=\chi_k)/M]^T$, where $F=[T_1\ T_2\ \ldots\ T_s]$ is a vector of targets, and M is a constant used to represent $\theta_k^{(2)}$. In this case $x_k$ is used to track $\theta_k^{(1)}$. Also $l(y_{k+1},u_k x_k)=y_{k+1}-Fu_k$, the error from target of the measured process output. The controller dynamics in the EWMA case are $$f(\chi_k,y_{k+1},u_k)=\chi_k+\lambda(y_{k+1}-Fu_k).$$

The system [16] also encompasses the case where one has a human in the loop (e.g. no supervisory control). In this case the function f would be such that $\Pi$ would be constant, with its value changing only on manual updates.

Since the only unmeasurable quantity in [16] is $\theta_k$, we need to only set up the information state for this variable. The rest of the variables can be observed, e.g. the controller clearly knows its own state $\Pi_k$, and we need not estimate them. The following result presents the finite dimensional form of the information state, and the recursive update equations.

Theorem 6. Consider the nonlinear system [16], and assume that $E(\Pi_k, u_k)$ and $G(\Pi_k, u_k)$ have full row rank. Furthermore, assume that $K(\Pi_k, u_k)$ has full rank. Then given $\gamma>0$, the information state for this system is finite dimensional, and has the form $$p_k(\theta)=(\theta-\bar{\theta}_k)^T P_k(\theta-\bar{\theta}_k)+c_k,\ P_k=P_k^T\epsilon\square^{n_2 x n_2},\ \bar{\theta}_k\epsilon\square^{n_2},k=0,1,\ldots$$

with $P_0$ symmetric and strictly negative definite, $c_o=0$, and $\bar{\theta}\epsilon\square^{n_2}$. Furthermore, $P_k$ and $\bar{\theta}_k$ are updated recursively by the following equations:

$$P_{k+1}=\gamma^2\bar{E}(\chi_k,u_k)[\gamma^2 K(\chi_k,u_k)S_k^{-1}K(\chi_k,u_k)^T-E(\chi_k,u_k)^T]\bar{E}(\chi_k,u_k)$$

$$\bar{\theta}_{k+1}=E(\chi_k,u_k)E(\chi_k,u_k)^T(\gamma^2 K(\chi_k,u_k)S_k^{-1}K(\chi_k,u_k)^T- \quad [17]$$

$$E(\chi_k,u_k)E(\chi_k,u_k)^T)^{-1}K(\chi_k,u_k)S_k^{-1}(P_k\bar{\theta}_k-\gamma^2 g(\chi_k,u_k)y_{k+1})$$

where $S_k = -P_k + \gamma^2 g$ $(\chi_k, u_k)\overline{G}$ $(\chi_k, u_k)g(\chi_k, u_k)^T$ $+\gamma^2 K^T(\chi_k, u_k)\overline{E}$ $(\chi_k, u_k)K(\chi_k, u_k)\overline{E}$ $(\chi_k, u_k) = (E(\chi_k, u_k)E$ $(\chi_k, u_k)^T)^{-1}; \overline{G}$ $(\chi_k, u_k) = (G(\chi_k, u_k)G$ $(\chi_k, u_k)^T)^{-1}$ with $S_k > 0$, $k = 0, 1, \ldots$ We intentionally do not consider the recursion for $c_k$ since it is independent of $\theta$ and hence does not influence the certainty equivalence estimate $\overline{\theta}_k$.

Proof. Given the structure of the system [16], we can write $p_{k+1}(\theta) = \sup\{p_k(\xi) + l$ $(y_{k+1}, u_k, x_k)^T l$ $(y_{k+1}, u_k, x_k) - \xi \epsilon^{\square n_2}$ $\gamma^2 |G(x_k, u_k)^T G$ $(x_k, u_k)(y_{k+1} - g$ $(x_k, u_k)^T \xi)|^2$ $-\gamma^2 |E(x_k, u_k)^T E$ $(x_k, u_k)(\theta - K$ $(x_k, u_k)\xi)|^2\}.$ Note that the RHS is at most quadratic in $\theta$ yielding the form of $p_k$ postulated in the theorem. Hence let $p_k(\theta) = (\theta - \overline{\theta}_k)^T P_k(\theta - \overline{\theta}_k) + c_k$. Substituting into the equation above this yields $p_{k+1}(\theta) = \sup\{(\xi - \overline{\theta}_k)$ $^T P_k(\xi - \overline{\theta}_k) + c_k + l$ $(y_{k+1}, u_k, x_k)^T l(y_{k+1}, u_k,$ $\chi_k) - \xi \epsilon^{\square n_2}$ $\gamma^2 |G(\chi_k, u_k)^T G$ $(\chi_k, u_k)(y_{k+1} - g$ $(\chi_k, u_k)^T \xi)|^2$ $-\gamma^2 |E(\chi_k, u_k)^T$ $\overline{E}(\chi_k, u_k)(\theta - K$ $(\chi_k, u_k)\xi)|^2\}.$ Collecting together the quadratic and linear terms in $\xi$ this equals $p_{k+1}(\theta) = \sup\{-\xi^T S_k$ $\xi + \xi^T R_k + R_k^T \xi + l$ $(y_{k+1}, u_k \chi_k)^T l$ $(y_{k+1}, u_k \chi_k)\xi \epsilon^{\square n_2}$ $-\gamma^2 y_{k+1}^T G$ $(\chi_k, u_k)y_{k+1} - \gamma^2 \theta^T$ $\overline{E}(\chi_k, u_k)\theta + c_k$ $\}$ [18]

where $S_k = -P_k + \gamma^2 g(\chi_k, u_k)\overline{G}(\chi_k, u_k)g(\chi_k, u_k)^T + \gamma^2 K^T(\chi_k, u_k)\overline{E}(\chi_k, u_k)K(\chi_k, u_k)$ $R_k = -P_k\overline{\theta}_k + \gamma^2 g(\chi_k, u_k)\overline{G}(\chi_k, u_k)y_{k+1} + \gamma^2 K(\chi_k, u_k)^T \overline{E}(\chi_k, u_k)\theta.$ Maximizing [18] with respect to $\xi$ yields $p_{k+1}(\theta) = R_k^T S_k^{-1} R_k$ $-\gamma^2 \theta^T \overline{E}(\chi_k, u_k)\theta$ $+c_k + \overline{\theta}_k^T P_k \overline{\theta}$ $k - \gamma^2 y_{k+1}^T G$ $(\chi_k, u_k)y_{k+1} + l$ $(y_{k+1}, u_k, \chi_k)^T l$ $(y_{k+1}, u_k, \chi_k).$ Collecting together like powers of $\theta$ yields $p_{k+1}(\theta) = \theta^T(\gamma^4 \overline{E}(\chi_k, u_k)K(\chi_k, u_k)S_k^{-1}K(\chi_k, u_k)^T \overline{E}(\chi_k, u_k) -$ $\gamma^2 \overline{E}(\chi_k, u_k))\theta + \gamma^2(-P_k\overline{\theta}_k +$ $\gamma^2 g(\chi_k, u_k)\overline{G}(\chi_k, u_k)y_{k+1})^T S_k^{-1} K(\chi_k, u_k)^T \overline{E}(\chi_k, u_k)\theta +$ $\gamma^2 \theta^T \overline{E}(\chi_k, u_k)K(\chi_k, u_k)S_k^{-1}(-P_k\overline{\theta}_k +$ $\gamma^2 g(\chi_k, u_k)\overline{G}^*(\chi_k, u_k)y_{k+1}) +$ $\ldots$ constant terms $\ldots$ $= (\theta - \overline{\theta}_{k+1})^T P_{k+1}(\theta - \overline{\theta}_{k+1}) + c_{k+1}$ $= \theta^T P_{k+1}\theta - \theta^T P_{k+1}\overline{\theta}_{k+1} - \overline{\theta}_k^T P_{k+1}\theta +$ constant terms.

From this it follows that $P_{k+1} = \gamma^2 \overline{E}$ $(\chi_k, u_k)(\gamma^2 K$ $(\chi_k, u_k)S_k^{-1}K$ $(\chi_k, u_k)^T \overline{E}$ $(\chi_k, u_k) - 1) = \gamma^2 \overline{E}$ $(\chi_k, u_k)(\gamma^2 K$ $(\chi_k, u_k)S_k^{-1}K$ $(\chi_k, u_k)^T - E$ $(\chi_k, u_k)E$ $(\chi_k, u_k)^T)\overline{E}$ $(\chi_k, u_k)\overline{\theta}_{k+1} = -P_{k+1}^{-1}$ $\gamma^2 \overline{E}(\chi_k, u_k)K$ $(\chi_k, u_k)S_k^{-1}(-P_k$ $\overline{\theta}_k + \gamma^2 g$ $(\chi_k, u_k)\overline{G}$ $(\chi_k,u_k)y_{k+1})=(\overline{E}$ $(\chi_k,u_k)[\gamma^2 K$ $(\chi_k,u_k)S_k^{-1}K$ $(\chi_k,u_k)^T\overline{E}$ $(\chi_k,u_k)-I])^{-1}\overline{E}$ $(\chi_k,u_k)$.

$K(\chi_k,u_k)S_k^{-1}$ $(P_k\overline{\theta}_k-\gamma^2 g$ $(\chi_k,u_k)\overline{G}$ $(\chi_k,u_k)y_{k+1})=E$ $(\chi_k,u_k)E(\chi_k,u_k)^T$ $(\gamma^2 K(\chi_k,u_k)S_k^{-1}K$ $(\chi_k,u_k)^T-E(\chi_k,u_k)E$ $(\chi_k,u_k)^T)^{-1}K$ $(\chi_k,u_k)S_k^{-1}$ $(P_k\overline{\theta}_k-\gamma^2 g$ $(\chi_k,u_k)\overline{G}$ $(\chi_k,u_k)y_{k+1})$.

We need $S_k$ to be positive definite for the maximum to exist in [18]. This is guaranteed provided that $P_k$ is negative definite. This is true provided $$\gamma^2 K(\chi_k,u_k)S_k^{-1}K(\chi_k,u_k)^T - E(\chi_k,u_k)E(\chi_k,u_k)^T < 0$$

or $$\gamma^2 K(\chi_k,u_k)S_k^{-1}K(\chi_k,u_k)^T < E(\chi_k,u_k)E(\chi_k,u_k)^T.$$

This is equivalent to (using the full rank assumption on $K(x_k, u_k)$)

$\gamma^2 < K(\chi_k,u_k)^{-1}$ $E(\chi_k,u_k)E(\chi_k,u_k)^T$ $K(\chi_k,u_k)^{-T}[-P_k$ $+\gamma^2 g(\chi_k,u_k)\overline{G}$ $(\chi_k,u_k)g(\chi_k,u_k)^T$ $+\gamma^2 K(\chi_k,u_k)^T E$ $(\chi_k,u_k)K(\chi_k,u_k)]$.

This implies $$\gamma^2 g(\chi_k,u_k)\overline{G}(\chi_k,u_k)g(\chi_k,u_k)^T - P_k > 0$$

which holds for any $\gamma > 0$.

Theorem 6 establishes the recursions for propagating the information states, and also illustrates their finite dimensionality. This makes the information state recursion [5] amenable to real-time computations. In fact, it also makes the dynamic programming equation [6] finite dimensional. This raises the possibilities of directly solving [6], and by-passing certainty equivalence altogether. However, note that if the system is n dimensional, then the dimension of the information state is $O(n^2)$, which could still pose significant numerical difficulties. Certainty equivalence helps alleviate this additional complexity, especially in light of theorem 1.

Thus, it is apparent that there has been provided in accordance with the present invention, a closed-loop dynamic dispatch policy for optimizing process performance that satisfies the advantages set forth above. Those advantages include minimizing the influence of process and inventory disturbances on process performance and minimizing idle time for machines. Although the present invention and its advantages have been described in detail, it should be understood that there is changes, substitutions, and alterations may be readily apparent to those skilled in the art and may be made without departing from the spirit and the scope of the present invention as defined by the following claims.

What is claimed is:

1. A method for dispatching available lots to unallocated machines, comprising:
    receiving metrics data providing performance measurements for a plurality of machines;
    determining a state for each of the machines based on the metrics data;
    receiving one or more lots to be dispatched, each lot having a lot type and each lot type associated with one of a plurality of models;
    selecting a preferred lot type for each of the plurality of models associated with each of the machines based on the state of the machine;
    selecting a preferred model based on a time since a last run of the model, a cost of switching to a new model and lot type, and the state of the machine;
    resolving conflicts between selected preferred lot type/preferred model combinations when insufficient lots are available to fill the selections; and
    assigning each lot to one of the machines according to the preferred model and preferred lot type selections.

2. The method of claim 1, further comprising determining a time since the last run of the model.

3. The method of claim 1, further comprising determining the cost of switching from a current model and lot type to the new model and lot type.

4. The method of claim 1, wherein resolving conflicts includes determining which machine of several machines will be assigned a lot based on a minimum maximum cost function.

5. A method for selecting a semiconductor lot for a fabrication process, comprising:
    storing process history for a fabrication process, the historic information including lot types previously run by the process;
    receiving and storing process metrics for lot types run by the fabrication process;
    determining a cost of switching for available lot types based on the historic information including process history and process metrics; and
    selecting from the available lot types a next lot type to be run by the fabrication process based on the cost of switching.

6. The method of claim 5, wherein selecting from the available lot types a next lot type to be run includes:
    each available lot type being associated with one of a plurality of models;
    selecting a preferred lot type for each of the plurality of models from the available lot types based on a state of the fabrication process; and selecting a preferred model from the plurality of models associated with the preferred lot types based on the historic information and the cost of switching resulting in a preferred model and lot type for the fabrication process.

7. A system for performance based dispatch of lots in a closed loop dispatch system, comprising:

one or more processes for performing functions within the closed-loop dispatch system wherein each process has one or more associated models for each function performed by the process, and wherein each model has one or more lot types defining specific details of the associated function;

a performance metrics database for collecting performance metrics data on the one or more processes;

a buffer for dynamically storing one or more lots available for dispatch to the one or more processes, each lot having a lot type;

each process operable to determine a preferred lot type for each model from the lot types represented in the buffer, the determination based on performance metrics data in the performance metrics database;

each process operable to determine a preferred model from the models associated with the preferred lot types, the determination made based on performance metrics data in the performance metrics database and a cost of switching to a new process; and an arbitrator for assigning a lot of a preferred lot type and preferred model to each process, the arbitrator further operable to resolve conflicts between processes requesting the same preferred lot type and preferred model when insufficient lots of the selected preferred lot type and preferred model are available in the buffer, the arbitrator resolving conflicts by selecting a number of requesting processes equal to the number of lots of a particular lot type available and assigning the available lots to the selected process.

8. A system for dispatching lots to be run on a machine, comprising:

one or more available lots to be processed by a work cell, each lot categorized by lot type, each lot type associated with a model;

a plurality of machines operable to process the available lots; and a dispatcher operable to allocate each of the available lots to one of the machines, the dispatcher further operable to receive machine metrics and downstream metrics, the dispatcher further operable to base its allocation of the available lots on the machine metrics, the downstream metrics, and a cost associated with switching from the previous model and lot type to a new model and lot type associated with the allocated lot.

* * * * *